United States Patent
Lee et al.

(10) Patent No.: US 9,767,693 B2
(45) Date of Patent: Sep. 19, 2017

(54) TRANSPARENT DISPLAY APPARATUS FOR DISPLAYING INFORMATION OF DANGER ELEMENT, AND METHOD THEREOF

(71) Applicant: SAMSUNG ELECTRONICS CO., LTD., Suwon-si (KR)

(72) Inventors: Han-sung Lee, Seoul (KR); Chang-soo Lee, Seosan-si (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/934,451

(22) Filed: Jul. 3, 2013

(65) Prior Publication Data
US 2014/0019005 A1    Jan. 16, 2014

(30) Foreign Application Priority Data
Jul. 10, 2012  (KR) .................. 10-2012-0075209

(51) Int. Cl.
G08G 1/16  (2006.01)
G08G 1/0962  (2006.01)

(52) U.S. Cl.
CPC ........... *G08G 1/166* (2013.01); *G08G 1/0962* (2013.01)

(58) Field of Classification Search
CPC .... G01S 2205/002; B60Q 1/525; B60Q 5/006
USPC ....... 701/36, 300, 301; 345/7, 958; 340/435, 340/436, 903; 180/232
See application file for complete search history.

(56) References Cited

U.S. PATENT DOCUMENTS

| | | | |
|---|---|---|---|
| 5,969,969 A | 10/1999 | Ejiri et al. | |
| 7,561,966 B2 | 7/2009 | Nakamura et al. | |
| 8,477,425 B2 * | 7/2013 | Border et al. | 359/630 |
| 8,538,636 B2 * | 9/2013 | Breed | 701/49 |
| 8,629,903 B2 | 1/2014 | Seder et al. | |
| 8,692,739 B2 * | 4/2014 | Mathieu et al. | 345/7 |
| 8,704,653 B2 * | 4/2014 | Seder et al. | 340/461 |

(Continued)

FOREIGN PATENT DOCUMENTS

| | | |
|---|---|---|
| CN | 1629930 A | 6/2005 |
| CN | 101872069 A | 10/2010 |

(Continued)

OTHER PUBLICATIONS

International Search Report mailed Oct. 28, 2013 in International Patent Application No. PCT/KR2013/006123.

(Continued)

*Primary Examiner* — Thomas G Black
*Assistant Examiner* — Ce Li
(74) *Attorney, Agent, or Firm* — Staas & Halsey LLP

(57) ABSTRACT

A transparent display apparatus which is used in a transportation apparatus includes: a communication unit which receives surrounding situation information, a controller which recognizes surrounding objects using the surrounding situation information, and determines a danger element that is likely to collide with the transportation apparatus using characteristics of the surrounding objects and a movement characteristic of the transportation apparatus, and a transparent display which displays information for informing a user of the danger element. Accordingly, a surrounding situation can be effectively presented.

25 Claims, 29 Drawing Sheets

(56) References Cited

U.S. PATENT DOCUMENTS

| | | | |
|---|---|---|---|
| 8,994,520 B2 | 3/2015 | Stählin et al. | |
| 2004/0178894 A1 | 9/2004 | Janssen | |
| 2005/0154505 A1 | 7/2005 | Nakamura et al. | |
| 2007/0173983 A1* | 7/2007 | Takahashi et al. | 701/1 |
| 2007/0279250 A1 | 12/2007 | Kume et al. | |
| 2008/0158096 A1* | 7/2008 | Breed | 345/7 |
| 2009/0096937 A1* | 4/2009 | Bauer et al. | 348/739 |
| 2010/0023234 A1* | 1/2010 | Kameyama | B60W 30/08 701/70 |
| 2010/0253489 A1* | 10/2010 | Cui et al. | 340/425.5 |
| 2010/0253492 A1* | 10/2010 | Seder et al. | 340/435 |
| 2010/0253493 A1* | 10/2010 | Szczerba et al. | 340/435 |
| 2010/0253494 A1 | 10/2010 | Inoue | |
| 2010/0253526 A1* | 10/2010 | Szczerba et al. | 340/576 |
| 2010/0253539 A1* | 10/2010 | Seder et al. | 340/903 |
| 2010/0253540 A1* | 10/2010 | Seder et al. | 340/905 |
| 2010/0253541 A1* | 10/2010 | Seder et al. | 340/905 |
| 2010/0253542 A1* | 10/2010 | Seder et al. | 340/932.2 |
| 2010/0253593 A1* | 10/2010 | Seder et al. | 345/7 |
| 2010/0253594 A1* | 10/2010 | Szczerba et al. | 345/7 |
| 2010/0253595 A1* | 10/2010 | Szczerba et al. | 345/7 |
| 2010/0253596 A1* | 10/2010 | Szczerba et al. | 345/7 |
| 2010/0253597 A1* | 10/2010 | Seder et al. | 345/7 |
| 2010/0253598 A1* | 10/2010 | Szczerba et al. | 345/7 |
| 2010/0253599 A1* | 10/2010 | Szczerba et al. | 345/7 |
| 2010/0253600 A1* | 10/2010 | Seder et al. | 345/7 |
| 2010/0253601 A1* | 10/2010 | Seder et al. | 345/7 |
| 2010/0253688 A1* | 10/2010 | Cui et al. | 345/443 |
| 2010/0289632 A1* | 11/2010 | Seder et al. | 340/436 |
| 2010/0292886 A1* | 11/2010 | Szczerba et al. | 701/29 |
| 2012/0062375 A1* | 3/2012 | Takeuchi et al. | 340/441 |
| 2012/0139816 A1* | 6/2012 | King et al. | 345/7 |
| 2013/0142385 A1* | 6/2013 | Mathieu et al. | 382/103 |
| 2013/0181823 A1* | 7/2013 | Stahlin | B60K 35/00 340/436 |
| 2013/0265232 A1* | 10/2013 | Yun et al. | 345/158 |

FOREIGN PATENT DOCUMENTS

| | | |
|---|---|---|
| DE | 10 2010 040803 A1 | 3/2012 |
| EP | 1 865 479 A1 | 12/2007 |
| EP | 2168815 A1 * | 3/2010 |
| JP | 10-206788 | 8/1998 |
| KR | 10-2010-0012945 | 2/2010 |
| KR | 10-2011-0134077 | 12/2011 |
| KR | 10-2012-0011228 | 2/2012 |
| WO | 2012/034834 A1 | 3/2012 |

OTHER PUBLICATIONS

Chinese Office Action dated Jun. 27, 2016 in corresponding Chinese Patent Application No. 201380037261.4.

European Search Report issued Apr. 13, 2016 in corresponding European Patent Application 13816585.7.

Chinese Office Action dated Mar. 22, 2017 in related Chinese Patent Application No. 201380037261.4 (11 pages) (19 pages English Translation).

European Examination Report dated Aug. 14, 2017 in related European Patent Application No. 13816585.7 (5 pages).

* cited by examiner

TRANSPARENT DISPLAY APPARATUS FOR DISPLAYING INFORMATION OF DANGER ELEMENT, AND METHOD THEREOF

CROSS-REFERENCE TO RELATED APPLICATIONS

This application claims priority benefit from Korean Patent Application No. 10-2012-0075209, filed on Jul. 10, 2012 in the Korean Intellectual Property Office, the disclosure of which is incorporated herein by reference in its entirety.

BACKGROUND

1. Field

The following description relates to a transparent display apparatus and a display method thereof, and more particularly, to a transparent display apparatus which displays information of a danger element on a transparent display, and a display method thereof.

2. Description of the Related Art

With the development of electronic technologies, various kinds of display apparatuses have been developed and distributed. In particular, research and discussion on a next generation display apparatus such as a transparent display apparatus have been accelerated in recent years.

The transparent display apparatus refers to an apparatus that has transparency, and thus allows a background behind the apparatus to be seen therethrough. A related-art display panel is manufactured using an opaque semiconductor compound such as silicon (Si) or gallium arsenide (GaAs). However, as various application fields that could not be handled by the related-art display panel have been developed, an effort to develop a new type of electronic element has been made. One of the things that has been developed with such an effort is a transparent display apparatus.

When using the transparent display apparatus, users can view necessary information through a screen of the transparent display apparatus, while seeing a background behind the apparatus. Therefore, space and time restraints that related-art display apparatuses have may be solved.

The transparent display apparatus may be easily used in various environments for various purposes. For example, the transparent display apparatus may be used as a show window of a store, or may be mounted in a transportation apparatus such as a vehicle, an airplane, or a ship.

Accordingly, there is a demand for a method for using transparency of a transparent display apparatus more effectively when the transparent display apparatus is applied to various environments.

SUMMARY

Additional aspects and/or advantages will be set forth in part in the description which follows and, in part, will be apparent from the description, or may be learned by practice of the invention.

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a transparent display apparatus which provides information effectively using transparency, and a display method thereof.

According to an aspect of an exemplary embodiment, a transparent display apparatus which is used in a transportation apparatus includes a communication unit which receives surrounding situation information; a controller which determines a danger element that is likely to collide with the transportation apparatus using the surrounding situation information and location information of the transportation apparatus; and a transparent display which displays information for informing a user of the danger element.

The controller may recognize surrounding objects using the surrounding situation information, and may determine the danger element from among the surrounding objects.

The transparent display apparatus may further include a location detector which detects a location of user's eyes.

In this case, the controller may determine a field of view of the user according to a result of the detecting by the location detector, may determine a surrounding object that is hidden by an obstacle within the field of view as the danger element, and may determine a display location of the information on the transparent display with reference to the location of the user's eyes.

The controller may compare, from all regions of the transparent display, a first penetration region which connects a first object existing within the field of view of the user and the locations of the user's eyes, and a second penetration region which connects a second object existing behind the first object and the locations of the user's eyes to determine whether the first penetration region and the second penetration region overlap each other, and, when it is determined that the first penetration region and the second penetration region overlap each other, the controller may determine that the first object is regarded as the obstacle to the second object.

The controller may display information on the danger element, which is hidden by the obstacle, on a penetration region through which the obstacle is seen from among all regions of the transparent display.

The transparent display apparatus may further include a location detector which detects a location of the user.

In this case, the controller may display the information on a region corresponding to the location of the user from among all regions of the transparent display.

The controller may adjust at least one of a color, a size, a display time, a display location, a blink state, a font, and a text thickness of the information which is displayed on the transparent display according to a characteristic of the danger element.

The information may be displayed in a direction in which the danger element is placed on the transparent display. The information may be a graphic object which represents at least one of a location of the danger element, a kind of the danger element, a distance between the transportation apparatus and the danger element, an approach speed of the danger element, and an estimated collision time.

The surrounding situation information may be information on surrounding objects which are located in a surrounding region including a current location of the transportation apparatus.

When the transportation apparatus enters a local region, the communication unit may receive the surrounding situation information of the local region from a server which manages the local region, and the transportation apparatus may be a vehicle and the transparent display may include a windshield of the vehicle.

The controller may determine a movement characteristic including at least one of information indicating whether the transportation apparatus is moved or not based on a change in a location of the transportation apparatus, a moving direction and a moving speed, and a future moving location, and may determine the danger element using the movement characteristic of the transportation apparatus and the surrounding situation information.

According to an aspect of an exemplary embodiment, a method for displaying of a transparent display apparatus which is used in a transportation apparatus includes receiving surrounding situation information; determining a danger element that is likely to collide with the transportation apparatus using the surrounding situation information and location information of the transportation apparatus; and displaying information for informing a user of the danger element on a transparent display.

The determining the danger element may include recognizing surrounding objects using the surrounding situation information, and determining the danger element from among the surrounding objects.

The method may further include: detecting a location of user's eyes; and determining a display location of the information on the transparent display with reference to the locations of the user's eyes, and the determining the danger element may include determining a field of view using the locations of the user's eyes, and determining a surrounding object that is hidden by an obstacle within the field of view as the danger element.

The determining the danger element may include: comparing, from all regions of the transparent display, a first penetration region which connects a first object existing within the field of view of the user and the locations of the user's eyes, and a second penetration region which connects a second object existing behind the first object and the locations of the user's eyes to determine whether the first penetration region and the second penetration region overlap each other; and when it is determined that the first penetration region and the second penetration region overlap each other, determining that the first object is regarded as the obstacle to the second object.

The displaying the information for informing the user of the danger element on the transparent display may include displaying information on the danger element which is hidden by the obstacle on a penetration region through which the obstacle is seen from among all regions of the transparent display.

The method may further include detecting a location of the user, and the displaying the information for informing the user of the danger element on the transparent display may include displaying the information on a region corresponding to the location of the user from among all regions of the transparent display.

The method may further include adjusting at least one of a color, a size, a display time, a display location, a blink state, a font, and a text thickness of the information which is displayed on the transparent display according to a characteristic of the danger element.

The information may be displayed in a direction in which the danger element is placed on the transparent display, and the information may be a graphic object which represents at least one of a location of the danger element, a kind of the danger element, a distance between the transportation apparatus and the danger element, an approach speed of the danger element, and an estimated collision time.

The surrounding situation information may be information on surrounding objects which are located in a surrounding region including a current location of the transportation apparatus.

The surrounding situation information of a local region that the transportation apparatus enters may be received from a server which manages the local region, and the transportation apparatus may be a vehicle and the transparent display may include a windshield of the vehicle.

The determining the danger element may include determining a movement characteristic including at least one of information indicating whether the transportation apparatus is moved or not based on a change in a location of the transportation apparatus, a moving direction and a moving speed, and a future moving location, and determining the danger element using the movement characteristic of the transportation apparatus and the surrounding situation information.

According to an aspect of an exemplary embodiment, a user terminal apparatus includes an interface which is connectible with a transportation apparatus; a communication unit which receives surrounding situation information from a server; and a controller which determines a danger element that is likely to collide with the transportation apparatus using the surrounding situation information and a location of the transportation apparatus, and provides information for informing a user of the danger element to the transportation apparatus through the interface.

When the transportation apparatus is connected to the user terminal apparatus through the interface, the controller may determine a location of the transportation apparatus using a GPS chip provided in the user terminal apparatus, may analyze the surrounding situation information and recognize surrounding objects, and may determine a surrounding object that is likely to collide with reference to the location of the transportation apparatus from among the surrounding objects as the danger element.

According to an aspect of an exemplary embodiment, a method for displaying of a user terminal apparatus includes receiving surrounding situation information from a server; determining a location of a transportation apparatus which is connected to the user terminal apparatus using a GPS chip provided in the user terminal apparatus; determining a danger element that is likely to collide with the transportation apparatus using the surrounding situation information and a location of the transportation apparatus; and providing information for informing a user of the danger element to the transportation apparatus and display the information.

According to the above-described various exemplary embodiments, the transparent display apparatus is applied to various environments and provides information effectively. In particular, if the transparent display apparatus is mounted in a transportation apparatus and used, information on a danger element is provided effectively and the danger may be prevented.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
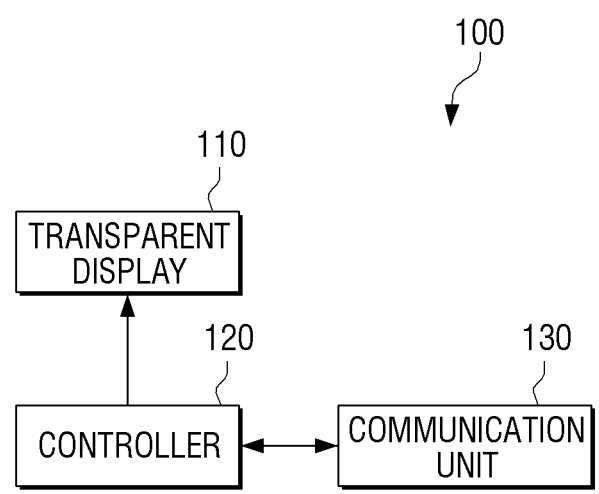
FIG. 1 is a block diagram illustrating a configuration of a transparent display apparatus according to an exemplary embodiment.

Reference will now be made in detail to the embodiments, examples of which are illustrated in the accompanying drawings, wherein like reference numerals refer to like elements throughout. The embodiments are described below to explain the present invention by referring to the figures.

Hereinafter, exemplary embodiments will be described in greater detail with reference to the accompanying drawings.

In the following description, the same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail because they would obscure the exemplary embodiments with unnecessary detail.

FIG. 1 is a block diagram illustrating a configuration of a transparent display apparatus according to an exemplary embodiment. Referring to FIG. 1, a transparent display apparatus 100 includes a transparent display 110, a controller 120, and a communication unit 130.

The transparent display 110 is made of transparent material and allows external objects to be seen therethrough.

The communication unit 130 communicates with external apparatuses with various communication methods.

The controller 120 controls an operation of the transparent display 110. The controller 120 may additionally display a variety of information while external objects are seen through the transparent display 110. The displayed information may be generated based on a result of communicating by the communication 130.

A type of information displayed on the transparent display 110 and a display location may be determined according to an environment in which the transparent display apparatus is mounted. That is, the above-described transparent display apparatus 100 may be mounted in various kinds of transportation apparatus, such as a vehicle, a ship, a motorcycle, a subway car, or a train, for example.

If the transparent display apparatus 100 is mounted in a vehicle, the transparent display apparatus 100 may be referred to as a vehicle head unit, a center fascia, or a vehicle control system, for example. Also, in this case, the transparent display 110 may be implemented by using a transparent window through which a user can see the outside in the transportation apparatus.

The communication unit 130 receives surrounding situation information from an external apparatus, and the controller 120 generates information based on the surrounding situation information.

The surrounding situation information may include a variety of information such as traffic information, path information, surrounding transportation apparatus information, and current location information, for example.

The controller 120 recognizes surrounding objects using the surrounding situation information, and determines a danger element that is likely to collide with a transportation apparatus in which the transparent display apparatus 100 is mounted with reference to a movement characteristic of the transportation apparatus.

The movement characteristic recited therein may include a location, a moving direction, a moving speed, an acceleration, and an estimated future location of the transportation apparatus, for example. The surrounding objects may include not only surrounding transportation apparatuses other than the transportation apparatus in which the transparent display apparatus 100 is mounted, but also an obstacle fixed at a corresponding location or other objects. For example, the surrounding objects may be a pedestrian, a bicycle, a motorcycle, a vehicle, or a ball, for example. Among these, the danger element may be an object that is hidden by an obstacle from the user's eyes, a pedestrian that jaywalks, a bicycle that violates a traffic signal, a motorcycle that speeds, or a child running after a ball into a road. The controller 120 determines whether the surrounding object is likely to collide with the transportation apparatus by considering the movement characteristic of the transportation apparatus and the movement characteristic of the surrounding object. It may be determined whether the surrounding object is an obstacle or not using a location of user's eyes and a location of the object.

Specifically, the controller 120 determines whether or not a first penetration area which connects a first object existing within a user's field of view to a location of user's eyes overlaps a second penetration area which connects a second object existing behind the first object and the location of the user's eyes. When it is determined that the two penetration areas overlap each other, it is determined that the first object is an obstacle to the second object. The method for determining the first and second penetration areas will be explained in detail.

The controller 120 displays information on the danger element on the transparent display 110. The information on the danger element may be displayed on an appropriate area from among entire areas of the transparent display 110. The information recited herein may be various graphic objects such as an image, a text, and a sign, a content reproducing screen, an application execution screen, and a web browser screen, for example.

When there is a danger element moving at high speed, the controller 120 may warn the user of the danger element in advance by displaying the information ahead of an estimated collision time.

As a result, the user who rides the transportation apparatus may identify the information on the danger element, while observing actual states of external objects seen through the transparent display 110. When the danger element exists in a blind spot so that it is not observed through the transparent display 110, the user may not see the real state of the danger element but may see information on the danger element. Therefore, the user can take a measure beforehand to prevent a collision with the danger element. The blind spot is an area that is hidden by an external obstacle or cannot be seen by the user due to a user's location or limited field of view.

The transparent display 110 may be implemented in various ways according to an exemplary embodiment. Specifically, the transparent display 110 may be implemented by using a transparent liquid crystal display (LCD), a transparent thin-film electroluminescent panel (TFEL), a transparent organic light emitting diode (OLED) display, and a projection type display, for example.

The transparent LCD is a transparent display apparatus which is implemented by using a pair of polarizing plates, an optical film, a transparent thin film transistor, and a transparent electrode, without a backlight unit. The transparent LCD has low transmittance due to the presence of the polarizing plates or the optical film, and has low light efficiency due to use of ambient light instead of a backlight unit, but has an advantage of being able to embody a large size transparent display. The transparent TFEL refers to an apparatus that uses an alternating current (AC) type inorganic thin film EL display (AC-TFEL) including a transparent electrode, an inorganic fluorescent substance, and an insulating film. The AC-TFEL is a display that emits light by exciting a fluorescent substance when an accelerated electron in the inorganic fluorescent substance passes. If the transparent display 110 is implemented by using the transparent TFEL, the controller 130 may adjust an electron to be projected onto an appropriate location and may determine an information display location. Because the inorganic fluorescent substance and the insulating film are transparent, a transparent display may be implemented.

The transparent OLED display is a transparent display apparatus that uses an OLED which can emit light by itself. Because an organic light emitting layer is transparent, the OLED display may be implemented as a transparent display apparatus if transparent electrodes are used as opposite electrodes. The OLED emits light when electrons and positive holes are injected through both organic light emitting layers and combine with each other in the organic light emitting layers. The transparent OLED injects electrons and positive holes into a desired location using this principle, and displays information.

Figure 2:
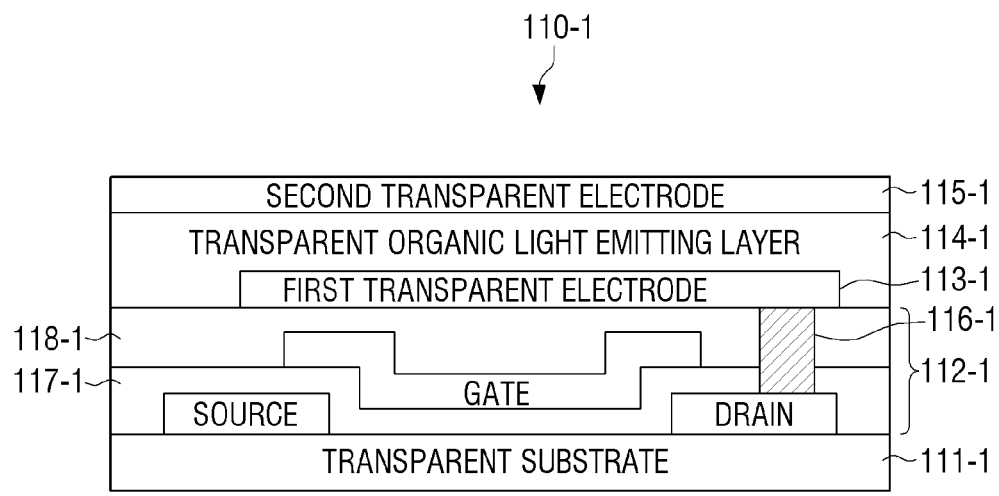
FIG. 2 is a view illustrating an example of a detailed configuration of a transparent display.

FIG. 2 is a view illustrating an example of a detailed configuration of a transparent display which is implemented by using a transparent OLED. For convenience of explanation, reference numeral 110-1 is used for the transparent display of the transparent OLED type as shown in FIG. 2.

Referring to FIG. 2, the transparent display 110-1 includes a transparent substrate 111-1, a transparent transistor layer 112-1, a first transparent electrode 113-1, a transparent organic light emitting layer 114-1, a second transparent electrode 115-1, a connection electrode 116-1, and dielectric films 117-1 and 118-1.

The transparent substrate 111-1 may use polymer material, such as plastics, having transparency, or glass. The material of the transparent substrate 111-1 may be determined according to an environment in which the transparent display apparatus 100 is used. For example, the polymer material may be used for a portable display apparatus because it is light and flexible, and the glass may be used for a show window of a store or a window of a transportation apparatus.

The transparent transistor layer 112-1 refers to a layer that includes a transistor which is manufactured by substituting opaque silicon of a related-art thin film transistor with transparent material such as transparent zinc oxide or titanium oxide. A source, a gate, a drain, and various dielectric films 117-1 and 118-1 may be provided in the transparent transistor layer 112-1, and the connection electrode 116-1 may be provided to electrically connect the drain and the first transparent electrode 113-1. Although only one transparent transistor including the source, the gate, and the drain is provided in the transparent transistor layer 112-1 in FIG. 2, a plurality of transparent transistors may be uniformly distributed on an entire area of the display surface. The controller 120 applies a control signal to the gate of each transistor in the transparent transistor layer 112-1, and drives the corresponding transparent transistor and displays information.

The first transparent electrode 113-1 and the second transparent electrode 115-1 oppose each other with reference to the transparent organic light emitting layer 114-1. The first transparent electrode 113-1, the transparent organic light emitting layer 114-1 and the second transparent electrode 115-1 constitute a transparent organic light emitting diode (OLED).

The transparent OLED is divided into a passive matrix OLED (PMOLED) and an active matrix OLED (AMOLED) according to a driving method. The PMOLED includes a pixel which is formed where the first and second transparent electrodes 113-1 and 115-1 intersect. On the other hand, the AMOLED includes a thin film transistor (TFT) to drive each pixel. FIG. 2 illustrates the AMOLED. Each of the first transparent electrode 113-1 and the second transparent electrode 115-1 includes a plurality of line electrodes, and the line electrodes are arranged perpendicular to each other. For example, if the line electrodes of the first transparent electrode 113-1 are arranged in a horizontal direction, the line electrodes of the second transparent electrode 115-1 are arranged in a vertical direction. Accordingly, a plurality of intersecting areas are formed between the first transparent electrode 113-1 and the second transparent electrode 115-1. The transparent transistor is connected to each intersecting area as shown in FIG. 2.

The controller 130 generates a potential difference in each intersecting area using the transparent transistor. Electrons and positive holes flow from each electrode into the transparent organic light emitting layer 114-1 in the intersection area in which the potential difference is generated, and combine with each other, such that light is emitted. On the other hand, light is not emitted from an intersecting area in which the potential difference is not generated. Accordingly, a background can be seen as it is.

Indium tin oxide (ITO) may be used for the first and second transparent electrodes 113-1 and 115-1. Also, new material, such as graphene, for example, may be used. Graphene is a material which has a planar structure of a honeycomb shape in which carbon atoms are connected to one another, and has transparency. The transparent organic light emitting layer 114-1 may be made of various materials.

As described above, the transparent display 110 may be implemented by using the transparent LCD, the transparent TFEL, and the transparent OLED. However, the transparent display 110 may be implemented by using a projection type display. The projection type display projects an image onto a transparent screen and displays it. For example, a system such as a head up display (HUD) corresponds to a projection type system.

Figure 3:
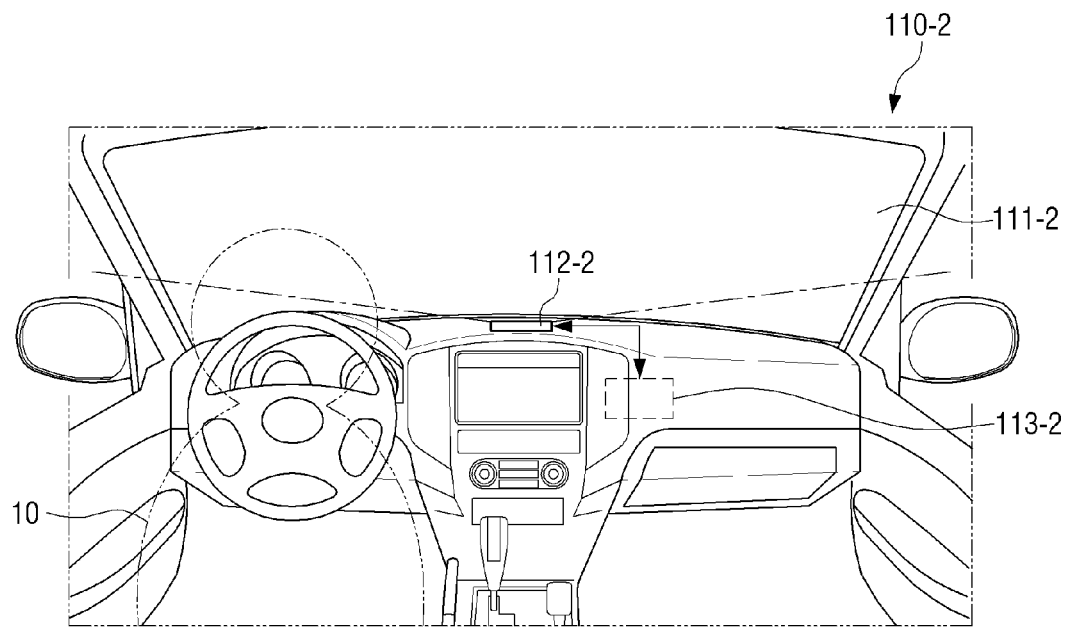
FIG. 3 is a view illustrating an example of a detailed configuration of a transparent display.

FIG. 3 is a view illustrating an example of a detailed configuration of a transparent display if the transparent display is implemented by using a projection type transparent display apparatus. In FIG. 3, reference numerals 110-2 is used for the projection type transparent display apparatus.

The projection type transparent display 110-2 includes a transparent screen 111-2, an optical apparatus 112-2, and a light source apparatus 113-2.

The light source apparatus 113-2 emits light to display information using various kinds of light sources such as a vacuum fluorescent display (VFD), a cathode ray tube (CRT), an LCD, or an LED, for example.

The optical apparatus 112-2 projects the light emitted from the light source apparatus 113-2 onto the transparent screen 111-2. The optical apparatus 112-2 may be implemented by using a light guide panel which includes at least one lens and a mirror.

The light source apparatus 113-2 and the optical apparatus 112-2 may be implemented as a single display module. Accordingly, the light source apparatus 113-2 and the optical apparatus 112-2 may be placed on the upper, lower, left, and right edges of the transparent screen 111-2, and may project light onto the transparent screen 111-2 such that information is displayed on the transparent screen 111-2. Also, a holographic method using laser as a light source may be implemented. In this case, information may be directly displayed on the transparent screen 111-2 using a laser.

The transparent screen 111-2 may be made of common glass. The configuration of the transparent display 110-2 of FIG. 3 may be used when the transparent display apparatus 100 is used as a window of a transportation apparatus such as a vehicle, a ship, and an airplane, a window in a general household, and a show window of a store, for example.

In FIG. 3, the transparent display 110 is implemented as a windshield of a vehicle. In this case, the optical apparatus 112-2 and the light source apparatus 113-2 may be placed on a lower area of the transparent display 110 in the vehicle where the user 10 sits. Hereinafter, a direction in which the user looks outside in the vehicle is referred to as a first direction, and the opposite direction is referred to as a second direction.

Although the window of the transportation apparatus is implemented by using a projection type display in FIG. 3, the window of the transportation apparatus may be implemented by using various types of transparent displays described above.

If the transparent display apparatus 100 is implemented as a window of a transportation apparatus such as a vehicle as described above, the user can see a variety of information displayed on the transparent display 110, while seeing a background behind the apparatus through the window. Accordingly, the user may obtain appropriate information according to a current state of the user and a surrounding characteristic of the transportation apparatus.

Figure 4:
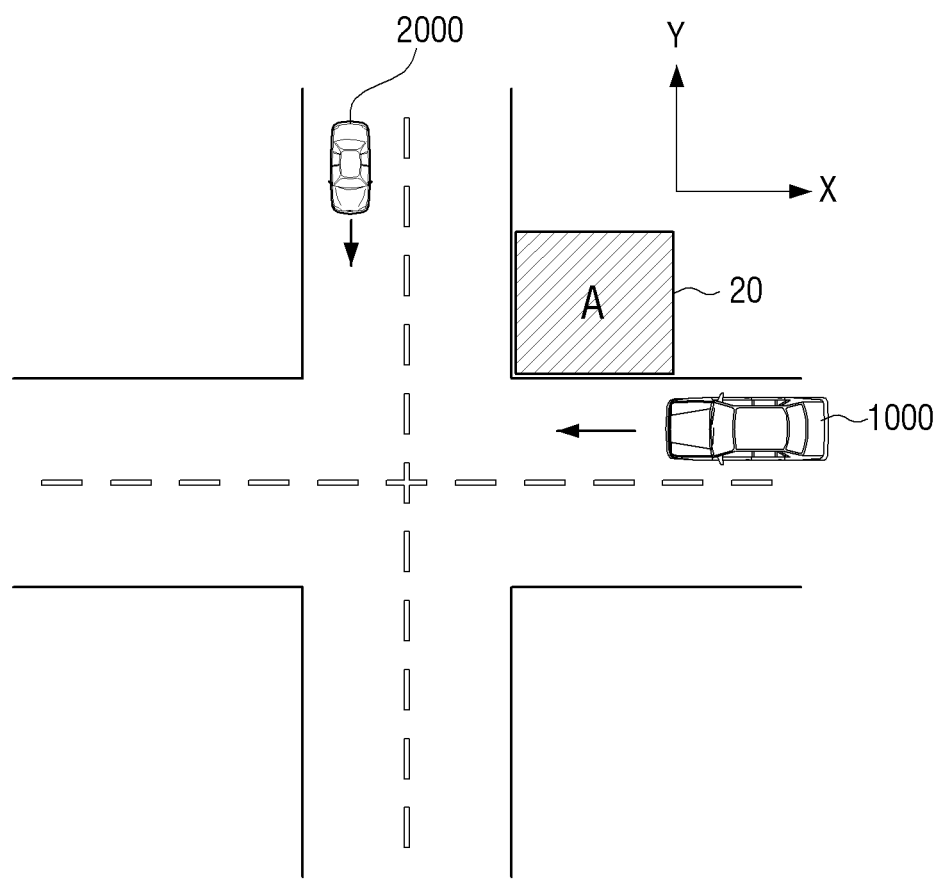
FIG. 4 is a view illustrating a method for displaying information in a transportation apparatus in which a transparent display apparatus is mounted.

FIG. 4 is a view to illustrate an example of a method for using the transparent display apparatus 100 on a real road when the transparent display apparatus 100 is applied to a vehicle. For convenience of explanation, a horizontal direction is defined as an X axis direction, and a vertical direction is defined as a Y axis direction in FIG. 4. Referring to FIG. 4, when a vehicle 1000 in which the transparent display apparatus 100 is mounted is moving in an X-direction and another vehicle 2000 is running in a Y-direction, the two vehicles are likely to collide with each other if they continue to move in their respective directions.

The controller 120 of the transparent display apparatus 100 mounted in the vehicle 1000 determines a possibility of a collision considering a moving direction and a moving speed of the vehicle 1000, and a moving direction and a moving speed of another vehicle. Specifically, the controller 120 calculates a first virtual line which extends from a heading direction of the vehicle 1000 and a second virtual line which extends from a heading direction of another vehicle 1000, considering the moving directions of the vehicles 1000 and 2000. The controller 120 calculates an intersection of the first and second virtual lines. The intersection is a point where a collision is likely to happen. The controller 120 calculates a first time (t1) that is required for the vehicle 1000 to reach the point where the collision is likely to happen with reference to a current location and a current speed of the vehicle 1000, and calculates a second time (t2) that is required for another vehicle 2000 to reach the point where the collision is likely to happen with reference to a current location and a current speed of another vehicle 2000. The controller 120 determines the possibility of the collision according to a difference between a difference (t1−t2) between the first and second times, and a predetermined time range. That is, the controller 120 determines that the possibility of the collision is high when the difference (t1−t2) falls within the predetermined time range, and, when the difference (t1−t2) is out of the predetermined time range, the controller 120 determines that the possibility of the collision is low in proportion with how the difference is out of the predetermined time range.

On the other hand, if an obstacle 20, such as a skyscraper, for example, exists at a corner of the intersection when the vehicle 1000 enters the intersection in the X-direction, another vehicle 2000 entering the intersection in the Y-direction may be hidden by the obstacle 20. In this case, when it is determined that the vehicle 1000 is likely to collide with another vehicle 2000 as described above, the controller 120 recognizes another vehicle 2000 as a danger element and displays information on the danger element on the transparent display 110. The displayed information may have various formats.

Figure 5:
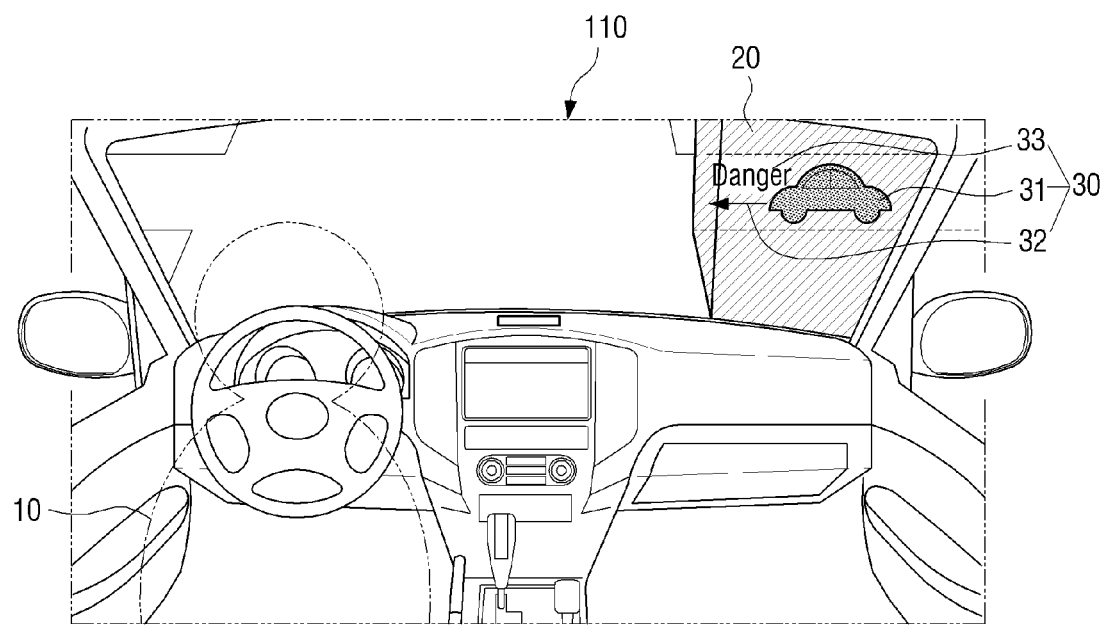
FIGS. 5 and 6 are views illustrating various examples of a method for displaying information.

FIG. 5 is a view illustrating an example of information which is displayed on the transparent display 110 in the situation of FIG. 4. Referring to FIG. 5, a real background behind the apparatus can be seen through the transparent display 110. Accordingly, although the obstacle 20 is seen on the right, another vehicle 2000 moving behind the obstacle 20 is hidden by the obstacle 20. The controller 120 determines a possibility of a collision between another vehicle 2000 and the vehicle 1000, and determines that another vehicle 2000 is a danger element when there is a possibility that another vehicle 200 collides with the vehicle 100. Therefore, in order for the user 10 to recognize presence of the danger element, a variety of information 30 is displayed on the transparent display 110.

Referring to FIG. 5, the information 30 includes a graphic image 31 corresponding to another vehicle 2000, an arrow image 32 indicating a moving direction of another vehicle 2000, and a text 33 informing that another vehicle 2000 is a danger element. Such information 30 is displayed on an area corresponding to a real location of another vehicle 2000 from among entire areas of the transparent display 110. That is, as shown in FIG. 5, the information 30 is displayed on the area through which the obstacle 20 is seen. Accordingly, the user can intuitively know that the danger element exists behind the obstacle 20.

The controller 120 may adjust a display state of the information 30 according to a characteristic of the obstacle 20 in various ways. Specifically, the controller 130 may adjust a color, luminance, transparency, a size, and a blink state of the information 30 considering a color, weather condition, ambient illumination, and a shade of the obstacle 20.

Although the information 30 is displayed on the area through which the obstacle 20 is seen, the display location of the information 30 may be changed variously.

Figure 6:
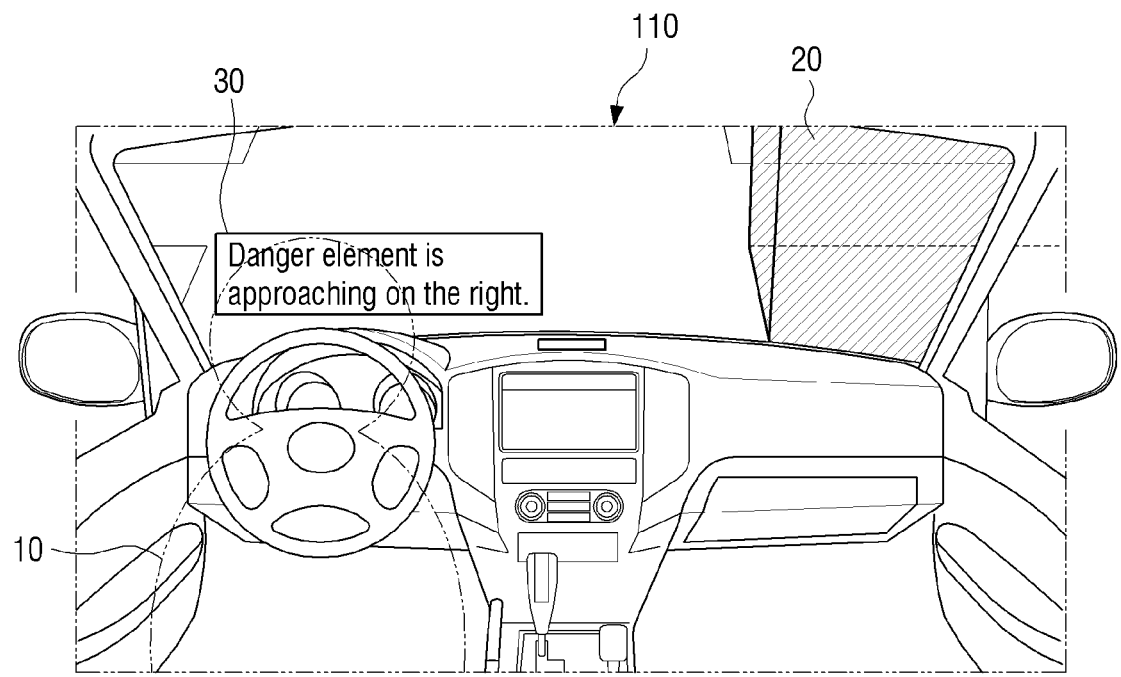

FIG. 6 is a view illustrating a method for displaying information according to an exemplary embodiment. Referring to FIG. 6, the information 30 may be displayed on an area corresponding to a location of the user 10. Specifically, the information 30 may be displayed in front of a driver's seat in which the user 10 sits.

At this time, the displayed information 30 may include a text or an arrow regarding a direction in which the danger element exists. In FIG. 6, the direction of the danger element is informed using text. Additionally, the information may include a location of the danger element and speed information. When there are a plurality of danger elements, a predetermined number of danger elements are displayed in order of a possibility of a collision and the other danger elements are displayed using simple graphic objects such as a small figure or a point, for example, such that only their locations and movements can be displayed. For example, when there is a car as a most dangerous element and there is a motorcycle behind the car, information on the car such as an image, a location, and a speed is displayed and information on the motorcycle is displayed with a simple figure behind the car image. Although only a visual image is illustrated in FIG. 6, the presence of the danger element may be informed audibly through a voice message or a notice sound.

The display location of the information 30 may be fixed to a specific location such as a front of the driver's seat or a center of the windshield. That is, in the case of a vehicle, a location of a driver's seat is fixed and a location of a user who sits in the driver's seat is not greatly changed, and thus an area through which the information 30 is best seen may be determined as a display area of the information 30. However, this is merely an example, and the display location of the information 30 may be changed according to a movement of the user.

That is, the transparent display apparatus 100 may identify a user's location on a real time basis using a camera, an optical sensor, and a motion sensor. The controller 120 displays the information 30 on an area corresponding to the user's location.

Figure 7:
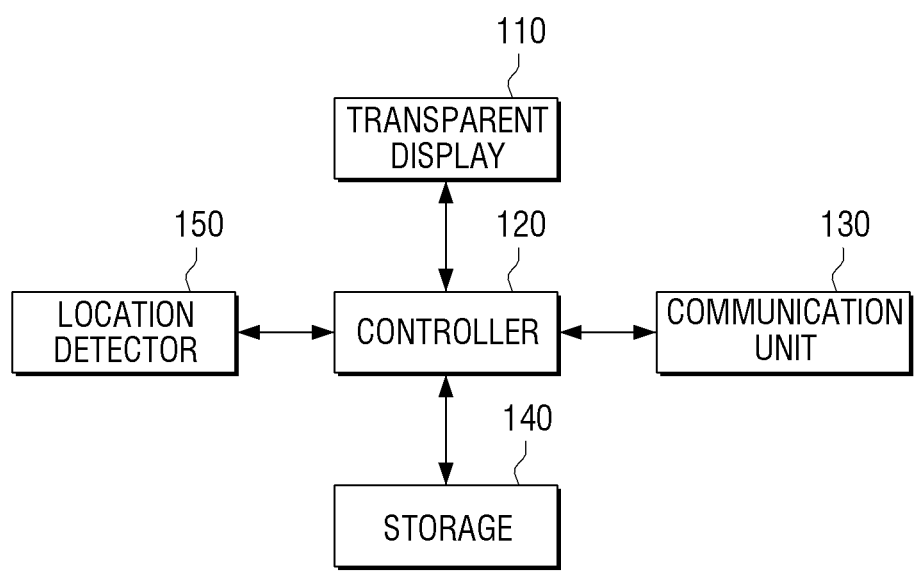
FIG. 7 is a block diagram illustrating a configuration of a transparent display apparatus according to an exemplary embodiment.

FIG. 7 is a block diagram illustrating a configuration of a transparent display apparatus 100 which detects a user's location and displays information according to a result of the detecting according to an exemplary embodiment. Referring to FIG. 7, a transparent display apparatus 100 includes a transparent display 110, a controller 120, a communication unit 130, a storage 140, and a location detector 150.

The transparent display 110 may be implemented in various forms as described above.

The controller 120 controls overall operations of the elements of the transparent display apparatus 100.

The communication unit 130 communicates with an external apparatus. The external apparatus recited herein may be implemented by various apparatuses such as a local server which manages a local area, a traffic control server, an external transportation apparatus, and a user terminal apparatus.

The storage 140 is an element that stores various programs and data which are used in the transparent display apparatus 100.

The location detector 150 is an element that detects a location of a user who uses the transparent display apparatus 100. The location detector 150 may detect a user's location using a camera, a motion sensor, or a proximity sensor. A method for detecting a user's location will be explained below in detail. The location detector 150 may detect a user's head location, and more precisely, may detect a user's eye location.

When the user's location is detected by the location detector 150, the controller 120 may display information considering the user's location. For example, the controller 120 may display the information on an area corresponding to an intersection where a line connecting the user's location and a danger element meets the transparent display 110.

For an example, the controller 120 may display the information on an area in front of the user's location from among entire areas of the transparent display 110.

Also, the controller 120 may trace a user's face direction according to a result of the detecting by the location detector 150, and may determine a user's field of view. Accordingly, a display location of the information may be adjusted such that the information can be seen within the user's field of view.

Also, the controller 120 may determine only an external transportation apparatus that is hidden by an obstacle within the user's field of view as a danger element. It is determined whether the external transportation apparatus is hidden by the obstacle or not considering the user's location, a location of the obstacle, and a location of the external transportation apparatus.

Figure 8:
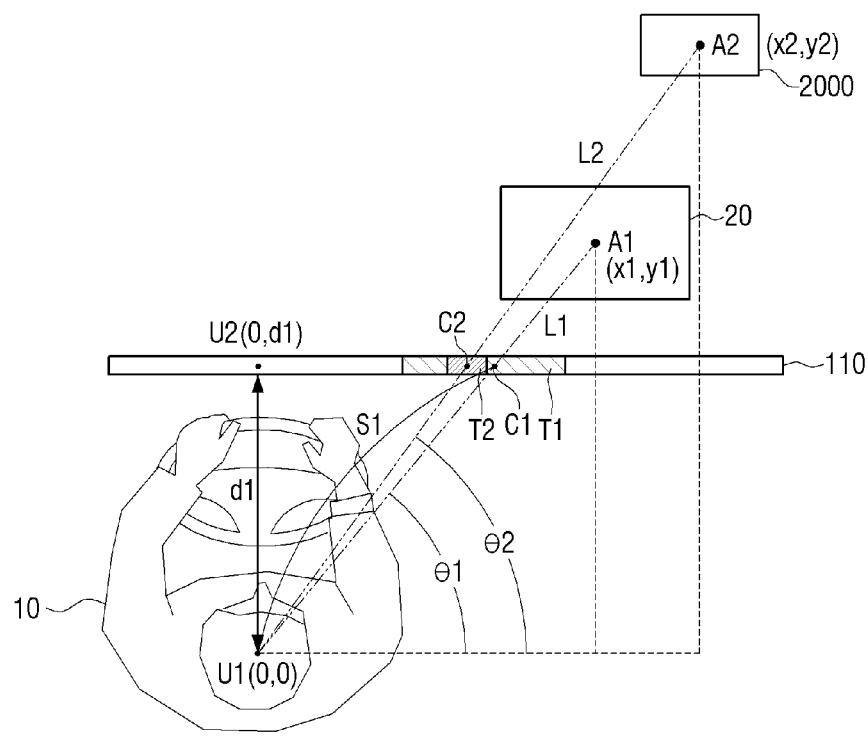
FIG. 8 is a view illustrating a method for determining an information display area considering a location of a user, a location of an obstacle, and a location of a surrounding transportation apparatus.

FIG. 8 is a view to explain a method for determining a danger element considering a user's location and locations of an obstacle and an external transportation apparatus which are detected by the location detector 150.

In FIG. 8, it is assumed that the user's location is defined by U1 (0, 0), the location of the obstacle 20 is defined by A1 (x1, y1), and the location of the danger element 2000 is defined by A2 (x2, y2). In this case, an area of the transparent display 110 that allows light reflected from the obstacle 20 to enter therethrough, that is, a penetration area T1, is formed on an area corresponding to a size of the obstacle 20 with reference to C1, as shown in FIG. 8. Also, an area that allows the external transportation apparatus 2000 to be seen therethrough when there is no obstacle, that is, a penetration area T2, may be formed with reference to C2 as shown in FIG. 8.

Also, it is assumed that a lineal distance between the user's location and the transparent display 110 is defined by d1, a line connecting the location of the user 10 and the obstacle 20 is defined by L1, an angle between L1 and a surface of the transparent display 110 is defined by θ1, a line connecting the location of the user 10 and the external transportation apparatus 2000 is defined by L2, and an angle between L2 and the surface of the transparent display 110 is defined by θ2.

In this state, d1 may be measured by the location detector 150. For example, if the location detector 150 includes a camera, a size of an object corresponding to the user in an image photographed by the camera is calculated, and a distance to the user is estimated according to a ratio of the object size to the whole size of the photographed image. Also, if the location detector 150 includes a light emitting diode and a light receiving diode, a distance to the user may be calculated according to a time that is required for light emitting from the light emitting diode to be reflected from the user 10 and received at the light receiving diode.

The distance to the obstacle 20 and the angle with the obstacle 20 may be obtained using a general camera, or may be obtained using a depth camera (not shown). The controller 120 may measure the distance to the obstacle 20, the angle with the obstacle 20, and a size of the obstacle 20 using an image photographed by the depth camera. In particular, the angle may be calculated by calculating a distance to the obstacle from a center of the image photographed by the depth camera. However, an error may occur in the measured distance or angle according to an installation location and an installation direction of the depth camera during such a calculating process. However, if the transportation apparatus is not large, the error is not critical and thus is disregarded.

When the angle θ1 with the obstacle 20 is measured, the controller 120 may obtain a lineal distance s1 between U1 and C1 using d1/cos θ1. Also, coordinates of C1 may be obtained by calculating s1/sin θ1.

The controller 120 may estimate the penetration area T1 having a size in proportion to the size of the obstacle with reference to C1.

In the same way, the controller 120 may obtain an intersection C2 where the line L2 connecting the external transportation apparatus 2000 and the user meets the transparent display 110. However, because the external transportation apparatus 2000 is placed on a location that cannot be photographed by the depth camera, a location, a distance, and an angle of the external transportation apparatus 2000 may be provided based on surrounding situation information. When C2 is included in T1, the controller 120 determines that the external transportation apparatus 2000 is hidden by the obstacle and is a danger element that is likely to cause a collision.

Figure 9:
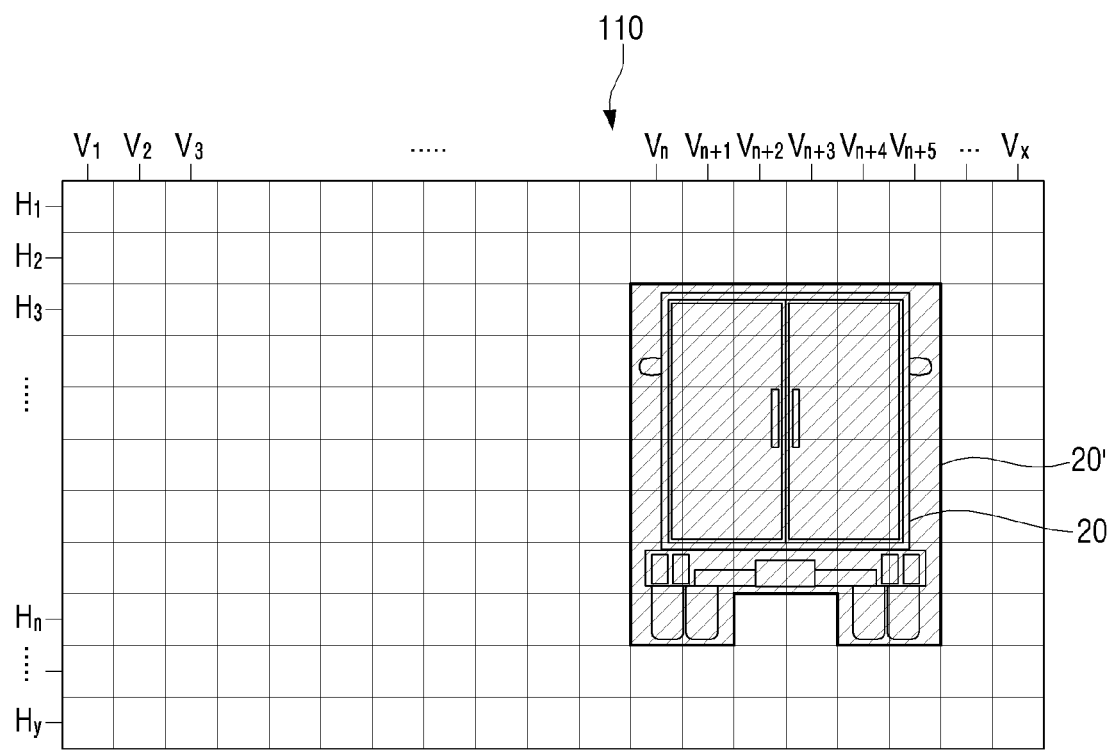
FIGS. 9 to 11 are views illustrating a method for determining an area on which information is displayed from among entire areas of the transparent display.
Figure 10:
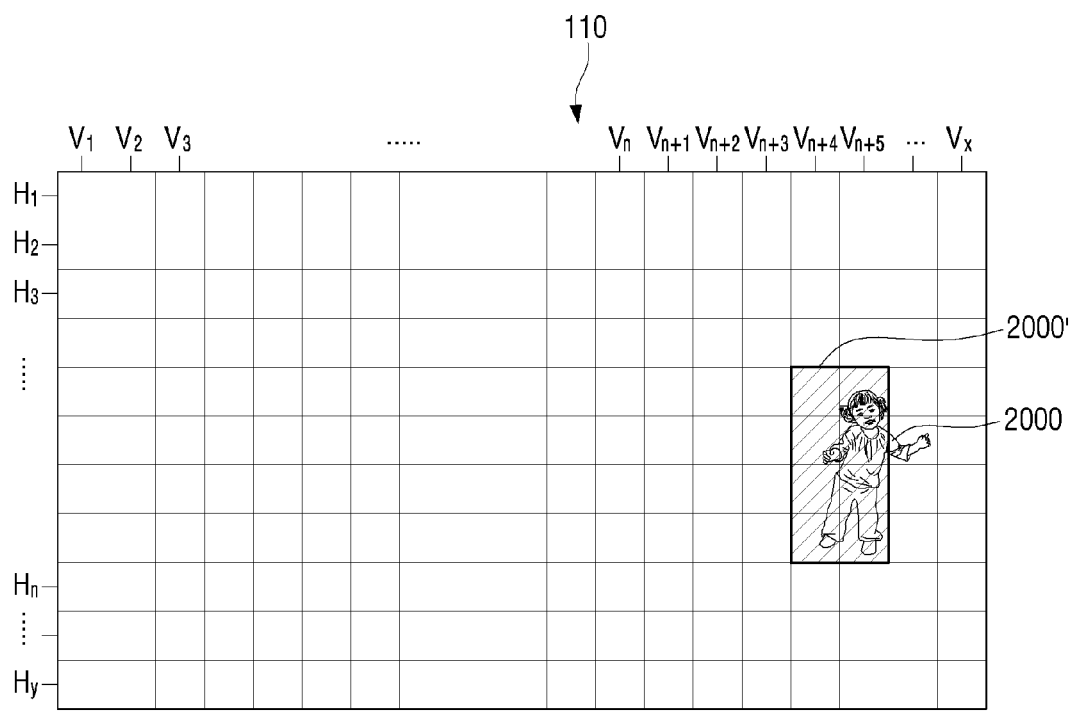
Figure 11:
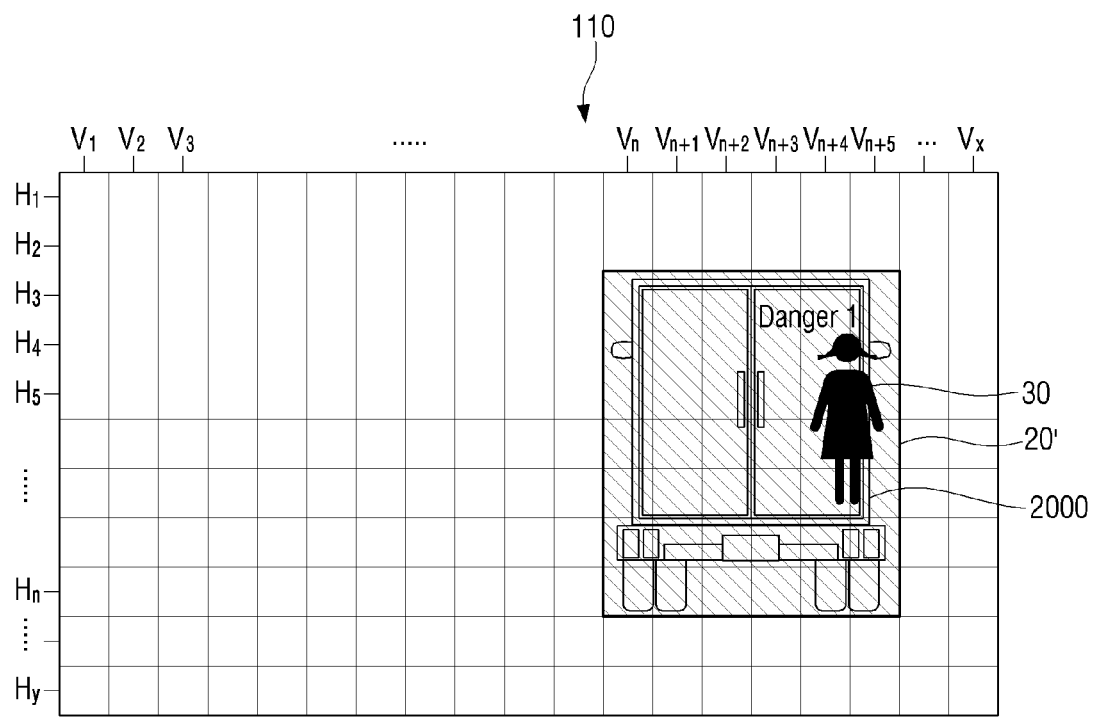

FIGS. 9 to 11 are views illustrating a method for displaying a screen with a danger element. Although FIG. 9 illustrates a rectangular transparent display 110 for convenience of explanation, the transparent display 110 is not necessarily rectangular, in order to be applied to a real vehicle.

Referring to FIG. 9, the controller 120 divides an entire area of the transparent display 110 into a plurality of cells. The cells may be divided into a plurality of columns V1 to Vx and a plurality of lines H1 to Hy.

In FIG. 9, a first external object 20 is seen through the transparent display 110. The controller 120 determines an area through which the first external object 20 is seen, that is, a penetration area 20', from among entire areas. Because the first external object 20 is placed on a location that can be really seen, the penetration area 20' of the first external object 20 may be determined using an image which is photographed by a camera provided in the transparent display apparatus 100 or a vehicle.

The controller 120 may store a matrix table including the plurality of cells corresponding to the transparent display 110 in the storage 140. Accordingly, the controller 120 may determine whether an external transportation apparatus determined based on surrounding situation information is recognizable by the user or not.

FIG. 10 illustrates an example of a matrix table which is managed by the controller 120. The matrix table of FIG. 10 may be stored in the storage 140.

When an external transportation apparatus 2000 exists on a location as shown in FIG. 10, the controller 120 estimates a virtual penetration area 2000' according to the location and direction of the external object 2000. The method for estimating the virtual penetration area 2000' has been described above and thus a redundant explanation is omitted. The controller 120 determines whether the penetration area 20' of FIG. 9 overlaps the virtual penetration area 2000' or not and determines whether the external object 2000 is a danger element that exists on a blind spot which is not recognizable by the user.

FIG. 11 is a view illustrating a method for displaying information when it is determined that the external transportation apparatus 2000 is a danger element. Referring to FIG. 11, the controller 120 superimposes information 30 on the obstacle 20 from among the entire areas of the transparent display 110.

In FIG. 11, the information 30 is displayed on the transparent display 110 which is implemented as a windshield. However, if the transparent display 110 is implemented as a side view mirror or a rear windshield, the information may be displayed on the side view mirror or the rear windshield according to a user's eye location, direction of view, or face direction, for example.

In this case, if a danger element is found when the user neglects to keep eyes forward, it is possible to call user's attention by displaying information using a transparent display existing in a user's face direction. That is, when it is determined that the user turns his/her head to the right while driving a vehicle, information may be displayed on a window of a passenger seat located on the right. At this time, because the information is not displayed according to an exact location of the danger element, the information may be regarded as a kind of information informing only a dangerous situation. Also, when it is determined that the user looks back, the information may be displayed on the rear windshield.

Although exemplary embodiments in which the transparent display apparatus 100 determines an external danger element and displays information have been described above, the transportation apparatus may further include a display apparatus besides the transparent display apparatus 100. Accordingly, the above-described exemplary embodiments may be implemented by a single display control system including a transparent display apparatus.

Figure 12:
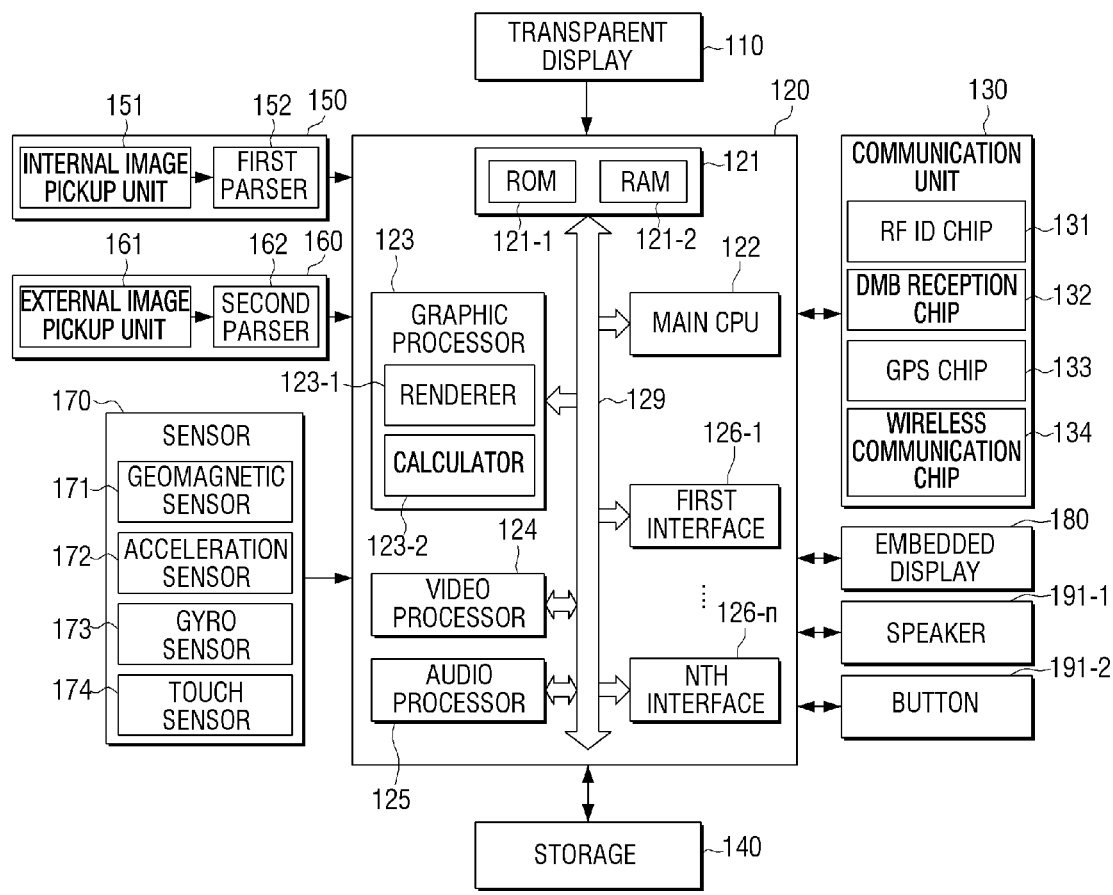
FIG. 12 is a block diagram illustrating a configuration of a display control system according to various exemplary embodiments.

FIG. 12 is a block diagram to explain a configuration of a display control system according to various exemplary embodiments.

Referring to FIG. 12, a display control system includes a transparent display 110, a controller 120, a communication unit 130, a storage 140, a location detector 150, an external detector 160, a sensor 170, an embedded display 180, a speaker 191-1, and a button 191-2.

The configuration and operation of the transparent display 110 have been described in the above-described exemplary embodiments and thus a redundant explanation is omitted.

The location detector 150 is an element that detects a user's location in a transportation apparatus as described above. The location detector 150 includes an internal image pickup unit 151 and a first parser 152.

The internal image pickup unit 151 is disposed in the transportation apparatus and photographs an image. Specifically, the internal image pickup unit 151 may be disposed on a location in proximity to the user sitting in a driver's seat, such as a room mirror, a handle, a dash board, or a sun roof, for example.

The first parser 152 detects an area representing the user from the image photographed by the internal image pickup unit 151, and provides information on the area to the controller 120. The first parser 152 detects edges of objects included in the image using pixel information of the image photographed by the internal image pickup unit 151. The edges may be detected in various detection algorithms.

For example, the first parser 152 divides the image into a plurality of blocks by dividing it on a basis of m*n pixels. The first parser 152 detects a representative value of each block. The representative value may be an average pixel value of all pixels in a corresponding block, a pixel value which most frequently appears from among the pixel values of a corresponding block, or a sum total of all pixel values. The first parser 152 compares the representative values and determines whether there are blocks having similar representative values and continuously arranged. The blocks included in an area on which the same object is photographed have similar representative values.

When it is determined that are continuous similar blocks, the first parser 152 detects a block corresponding to a boundary between blocks having representative values different from those of the identified similar blocks, as an edge.

After that, the first parser 152 identifies an object photographed in the image using the detected edge. For example, if more than a predetermined number of blocks having pixel values corresponding to a user's facial color as representative values are continuously arranged and are similar to a facial shape, the first parser 152 detects a corresponding area as a user's facial area and provides information on the area to the controller 120.

The controller 120 may estimate a distance between the user and the transparent display 110 according to a size of the detected facial area. The distance may be estimated based on a database which is generated by pre-conducted experiments. For example, a number of blocks corresponding to a facial area and a corresponding distance are actually measured and matching values are stored as a database.

Also, the controller 120 may determine whether the user is driving while drowsy or is driving impaired by analyzing a facial color or an eye's size of the user from the photographed user image. For example, if a facial muscle does not move for more than a predetermined time (for example, 1 second) and an eyelid is closed, or if the user lowers his/her head periodically, the controller 120 may determine that the user is driving while drowsy. Also, if a facial color becomes redder than usual, the controller 120 may determine that the user is driving while impaired. When it is determined that the user is in such an abnormal state, the controller 120 may display a message to warn the user of his/her state through the transparent display or may provide a warning sound or a horn.

The controller 120 may determine a display location of information according to a user's eye location, and, when the user changes his/her posture by following a curved road or making a U-turn, the controller 120 may change the display location of the information according to the changed posture.

The external detector 160 is an element that photographs an object outside the transportation apparatus. The external detector 160 includes an external image pickup unit 161 and a second parser 162. The external image pickup unit 161 may be disposed outside the transportation apparatus. For example, the external image pickup unit 161 may be disposed in various directions such as around a headlight, front grills, or side view mirror. The second parser 162 parses an image photographed by the external image pickup unit 161 and provides a result of the parsing to the controller 120. The controller 120 determines a location of a surrounding object using the result of the parsing. The parsing method may be implemented in the same way as that of the first parser 152 of the location detector 150 and thus a redundant explanation is omitted.

The sensor 170 is an element including various sensors. Specifically, the sensor 170 may include a geomagnetic sensor 171, an acceleration sensor 172, a gyro sensor 173, and a touch sensor 174.

The geomagnetic sensor 171 is a sensor that senses a change in surrounding geomagnetism using a 2-axis or 3-axis fluxgate. The controller 120 may calculate azimuth using a geomagnetic value sensed by the geomagnetic sensor 171. Accordingly, the controller 120 may determine in which direction the transportation apparatus moves.

The acceleration sensor 172 is a sensor that measures acceleration and a direction of the acceleration when a movement is made. Specifically, the acceleration sensor 172 outputs a sensing value corresponding to the acceleration of gravity which changes according to a slope of a transportation apparatus to which the acceleration sensor is attached. The controller 120 may determine the slope of the transportation apparatus using the output value of the acceleration sensor 172.

The gyro sensor 173 is a sensor that, if a rotational motion occurs, senses an angular velocity by measuring Coriolis' force exerted in a velocity direction of the motion. The controller 120 may detect a rotation direction of the transportation apparatus using a value measured by the gyro sensor 173.

The touch sensor 174 is connected to the transparent display 110 or the embedded display 180 and senses a user's touch on each display 110 or 180. For example, if the touch sensor 174 is provided in the transparent display 110, the touch sensor 174 may include a transparent conductive film which is deposited on a substrate in the transparent display 110, such as an indium-tin oxide (ITO), and a film which is disposed on the transparent conductive film. Accordingly, when the user touches a screen, upper and lower plates are brought into contact with each other at a touch point and an electric signal is transmitted to the controller 120. The controller 120 recognizes the touch point using coordinates of an electrode to which the electric signal is transmitted. For an example, if the touch sensor 174 is provided in the embedded display 180, the touch sensor 174 may be implemented in the same way as a general touch screen. A detailed description thereof is omitted.

The communication unit 130 may include a radio frequency identification (RFID) chip 131, a digital multimedia broadcasting (DMB) reception chip 132, a global positioning system (GPS) chip 133, and a wireless communication chip 134.

The RFID chip 131 is a chip for communicating with an external medium according to an RFID communication standard. The RFID communication standard may use bands such as 135 kHz, 13.56 MHz, 433 MHz, 860 to 960 MHz, and 2.45 GHz. The RFID chip 131 may communicate using at least one of the above-mentioned frequency bands. In particular, a technology that uses a frequency of 13.56 MHz from among those frequency bands refers to a near field communication (NFC) method. If the RFID chip 131 is implemented by using an NFC chip operating in the NFC method, the RFID chip 131 may be provided in a door key of the transportation apparatus. Accordingly, when the user tags his/her own NFC terminal, the NFC chip 131 reads information recorded on the NFC terminal and transmits the information to the controller 120, and the controller 120 identifies whether the information is consistent with pre-stored information or not and opens the door key.

The DMB reception chip 132 is an element that receives and processes a DMB signal.

The GPS chip 133 is an element that receives a GPS signal from a GPS satellite and calculates a current location of the transportation apparatus.

The wireless communication chip 134 is an element that communicates with an external apparatus according to a wireless communication standard. Examples of the wireless communication standard may be Wi-Fi, Bluetooth, IEEE, and Zigbee.

As described above, the communication unit 130 may communicate with an external apparatus in various ways. For example, the communication unit 130 may communicate with a server apparatus which manages a local area, and may receive surrounding situation information. The controller 120 analyzes the surrounding situation information and recognizes surrounding objects. Accordingly, the controller 120 may determine an object that is likely to crash into the transportation apparatus from among the recognized surrounding objects as a danger element.

The embedded display 180 is a display element that is provided separately from the transparent display 110. The embedded display 190 may be implemented by using an LCD and may output a navigation screen, various content reproducing screens, and a vehicle state screen.

Additionally, the speaker 191-1 to output a sound and the button 191-2 to input various user commands may be included. The button 191-2 may be provided on a center fascia or other certain area in the vehicle, and may be implemented by using various types of buttons such as a mechanical button, a touch pad, or a wheel, for example.

The storage 140 may store various programs or data relating to the operation of the display control system, setting information which is set by the user, system operating software, various application programs, and information on operations corresponding to user's manipulation.

The controller 120 may perform various operations using a variety of software stored in the storage 140.

Referring to FIG. 12, the controller 120 includes a system memory 121, a main CPU 122, a graphic processor 123, a video processor 124, an audio processor 125, various interfaces 126-1 to 126-n, and a bus 129.

The system memory 121, the main CPU 122, the graphic processor 123, the video processor 124, the audio processor 125, and the various interfaces 126-1 to 126-n may be connected to one another through the bus 129 and may exchange data or signals with one another.

The first to nth interfaces 126-1 to 126-n are connected to the above-described elements. One of the interfaces may be a network interface which is connected to an external apparatus through a network.

The main CPU 122 accesses the storage 140 and performs booting using the O/S stored in the storage 140. Also, the main CPU 122 performs various operations using various programs, contents and data stored in the storage 140.

Specifically, the system memory 121 may include a read only memory (ROM) 121-1 and a random access memory (RAM) 121-2. The ROM 121-1 may store a set of commands to boot a system. When a turn on command is input and power is supplied, the main CPU 122 copies the O/S stored in the storage 140 into the RAM 121-2 according to a command stored in the ROM 121-1, executes the O/S and boots the system. When booting is completed, the main CPU 122 copies various application programs stored in the storage 140 into the RAM 121-2, executes the application programs copied into the RAM 121-2, and performs various operations.

The graphic processor 123 generates graphic objects indicating a variety of information under the control of the main CPU 122.

The graphic processor 123 includes a renderer 123-1 and a calculator 123-2. The calculator 123-2 calculates attribute values such as a coordinate value of a graphic object to be displayed, and a shape, a size, and a color of the graphic object. The renderer 123-1 generates a graphic object based on the attribute values calculated by the calculator 123-2. The graphic object generated by the renderer 123-1 may be displayed on the transparent display 110. The main CPU 122 may determine a display location of the graphic object considering a direction in which a danger element is placed or a user's location as described above. Also, the main CPU 122 may change details of the graphic object according to various situations such as a location, a type, a moving direction, a moving speed, and an acceleration of a danger element, and a distance to a transportation apparatus. If the danger element is a general vehicle, information including a text about a moving direction, a moving speed, and an estimated collision time of the vehicle may be generated in a graphic object form and may be displayed along with a general vehicle image. On the other hand, if the danger element is a living thing such as a person, information including various texts may be generated in a graphic object form and may be displayed along an image of the living thing.

The video processor 124 may include a video decoder, a renderer, and a scaler. Accordingly, the video processor 124 decodes video data included in a multimedia content, forms a frame by rendering the decoded video data, and scales a size of the formed frame according to an information display area. The main CPU 122 may display the frame formed by the video processor 124 on the embedded display 180 or the transparent display 110.

The audio processor 125 may include an audio decoder, a noise filter, and an amplifier. Accordingly, the audio processor 125 may perform audio signal processing such as decoding, filtering, and amplification with respect to audio data included in the multimedia content. The main CPU 122 outputs an audio signal which is processed by the audio processor 125 through the speaker 191-1.

The configuration of FIG. 12 is illustrated considering various functions of vehicles collectively when the display control system is mounted in the vehicle. Therefore, the display control system may further include an element which is different from those of FIG. 12, or some of the elements may be omitted or changed according to a kind of a transportation apparatus in which the display control system is mounted. Illustration and explanation of such modified exemplary embodiments are omitted.

The controller 120 may copy a program stored in the storage 140 into the system memory 121, may execute the program, and may perform various operations as described above.

Figure 13:
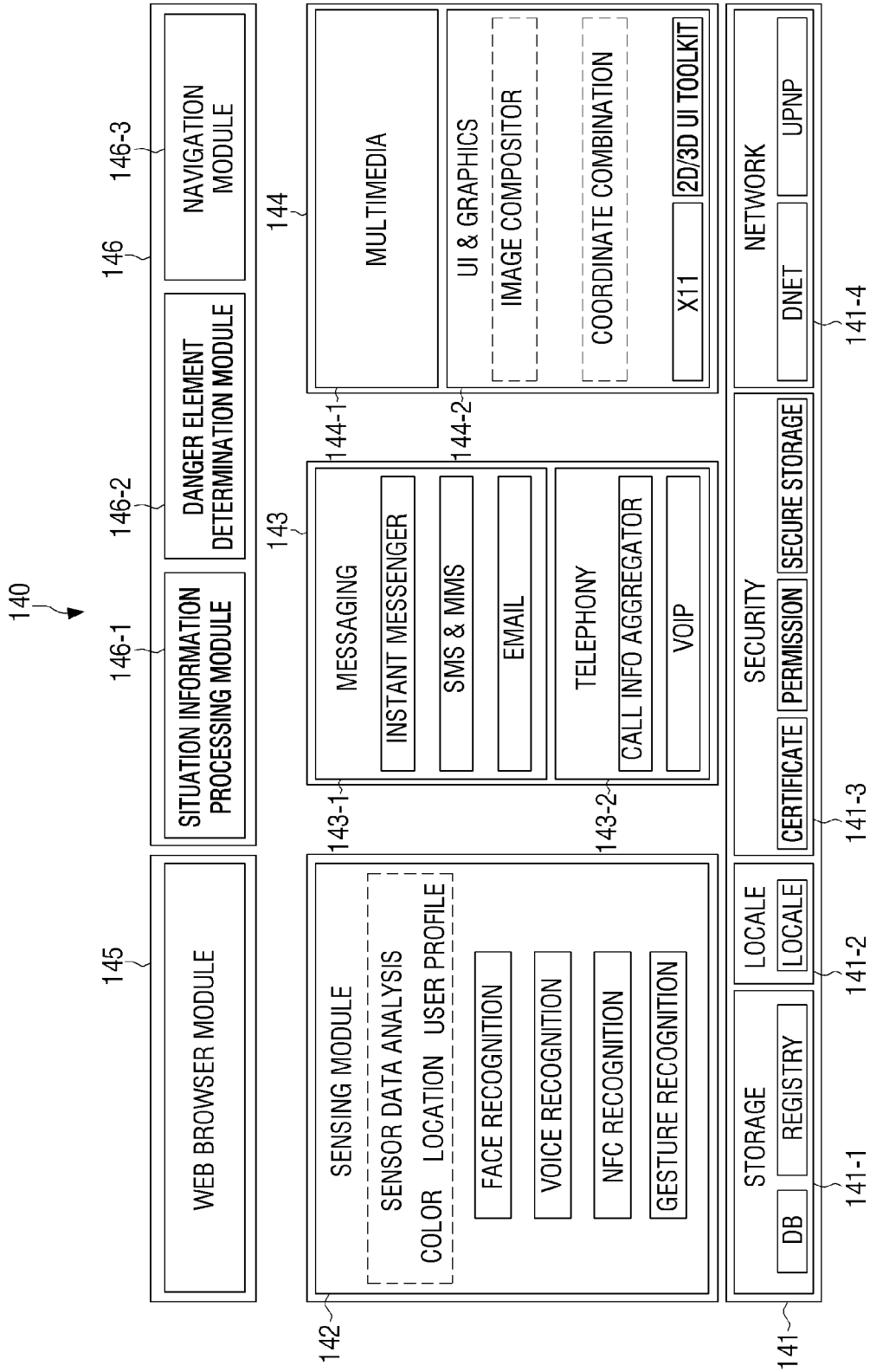
FIG. 13 is a view illustrating an example of a structure of software stored in a storage of FIG. 12.

FIG. 13 is a view to explain software layers which are stored in the storage 140. Referring to FIG. 13, the storage 140 may store software which includes a base module 141, a sensing module 142, a communication module 143, a presentation module 144, a web browser module 145, and a service module 146.

The base module 141 refers to a module which processes signals transmitted from within the display apparatus 100 and transmits the signals to an upper layer module.

The base module 141 includes a storage module 141-1, a location-based module 141-2, a security module 141-3, and a network module 141-4.

The storage module 141-1 is a program module which manages a database (DB) or a registry. The main CPU 122 may access the database in the storage unit 140 using the storage module 141-1, and may read out various data. The location-based module 141-2 is a program module which is interlocked with various hardware, such as a GPS chip, and supports a location-based service. The security module 141-3 is a program module which supports certification for hardware, permission of a request, and a secure storage. The network module 141-4 is a module to support network connection, and includes a Distributed.net (DNET) module and a Universal Plug and Play (UPnP) module.

The sensing module 142 is a module which collects information from various sensors included in the sensor 170, and analyzes and manages the collected information. Specifically, the sensing module 142 is a program module which detects manipulation attributes such as coordinates values of a point where touch is performed, a touch moving direction, a moving speed, and a moving distance. In addition, according to circumstances, the sensing module 142 may include a face recognition module, a voice recognition module, a motion recognition module, and an NFC recognition module.

The communication module 143 is a module to communicate with an external apparatus. The communication module 143 includes a messaging module 143-1 such as a messenger program, a short message service (SMS) and multimedia message service (MMS) program, and an email program, and a telephony module 143-2 which includes a call information aggregator program module and a voice over internet protocol (VoIP) module.

The presentation module 144 is a module which generates a display screen. The presentation module 144 includes a multimedia module 144-1 to reproduce a multimedia content and output the multimedia content, and a user interface (UI) and graphic module 144-2 to process a UI and graphics. The multimedia module 144-1 may include a player module, a camcorder module, and a sound processing module. Accordingly, the multimedia module 144-1 generates a screen and a sound by reproducing various multimedia contents, and reproduces the same. The UI and graphic module 144-2 may include an image compositor module to combine images, a coordinate combination module to combine coordinates on a screen to display an image and generate coordinates, an X11 module to receive various events from hardware, and a 2D/3D UI toolkit to provide a tool for configuring a UI of a 2D or 3D format.

The web browser module 145 is a module which performs web-browsing and accesses a web server. The web browser module 145 may include a web view module to render and view a web page, a download agent module to download, a bookmark module, and a web-kit module.

The service module 146 is an application module for providing various services. Referring to FIG. 13, the service module 146 may include various modules such as a situation information processing module 146-1, a danger element determination module 146-2, and a navigation module 146-3.

The situation information processing module 146-1 is a module which, when surrounding situation information is received from a surrounding server or a surrounding object, analyzes the received surrounding situation information and recognizes surrounding objects. The danger element determination module 146-2 is a module that determines whether a recognized surrounding object is a danger element considering a characteristic of the recognized surrounding object and a movement characteristic of the transportation apparatus. The main CPU 122 may specify a danger element by executing the situation information processing module 146-1 and the danger element determination module 146-2. The navigation module 146-3 is a module that provides various navigation functions using a current location received from the GPS chip 133.

When it is determined that a danger element exists as a result of executing the situation information processing module 146-1 and the danger element determination module 146-2, the main CPU 122 may execute the UI and graphic module 144-2 and provides various basic data for adjusting a display state of a graphic object to the graphic processor 123. The basic data may be a text to be included in the graphic object, and a kind, a size, a color, and a display time of an image. Accordingly, the graphic processor 123 generates a graphic object for the danger element and displays the graphic object on the transparent display 110 as described above.

Some of the various program modules illustrated in FIG. 13 may be omitted, changed, or added according to a kind and a characteristic of the display control system.

Figure 14:
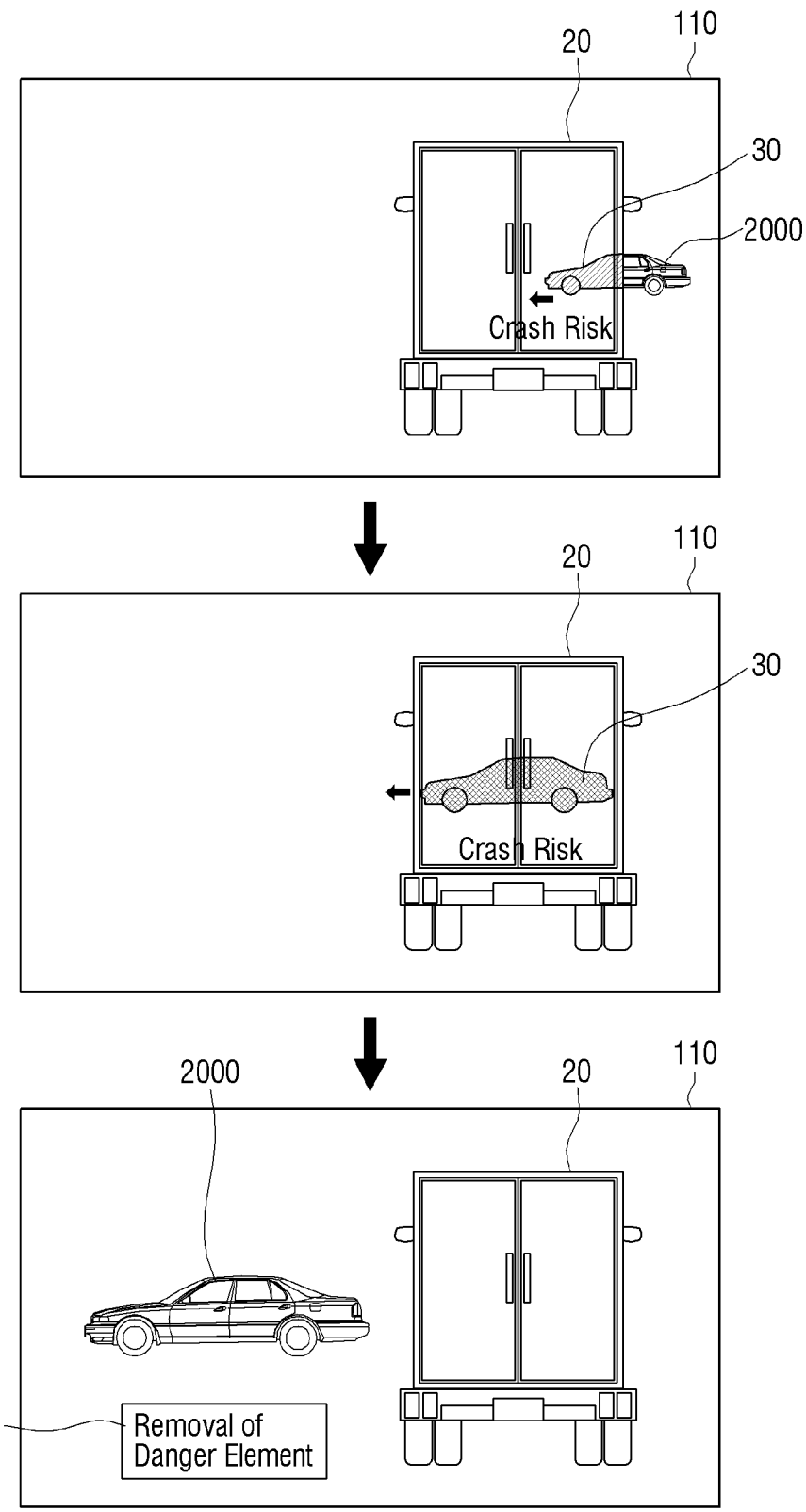
FIGS. 14 to 16 are views illustrating various examples of a method for displaying information on a transparent display.

As described above, the information on the danger element may be displayed on various locations. When the danger element is moved, the display location of the image may be adjusted according to a location to which the danger element is moved. FIG. 14 illustrates a display state of the transparent display 110 on which an information display location is adjusted according to an exemplary embodiment.

FIG. 14 illustrates a case in which another vehicle 20 is running ahead of a transportation apparatus and yet another vehicle 2000 enters ahead of the vehicle 20. In this case, the vehicle 20 ahead of the transportation apparatus is regarded as an obstacle and hides the entering vehicle 2000. The controller 120 analyzes surrounding situation information and identifies the entering vehicle 2000, and displays information 30 in a direction in which the entering vehicle 2000 is placed. In FIG. 14, the information 30 including an image representing a kind of the entering vehicle 2000, an arrow indicating a heading direction, and text may be displayed.

In this case, when the entering vehicle 2000 further approaches, a display location of the information 30 is adjusted and display attribute such as a size and a color of the information are also changed according to the location of the vehicle 2000 approaching. That is, as the risk of collision increases, the size of the information increases and the color of the information may be changed to a conspicuous color. Also, a flicking effect may be added or a warning sound may also be output.

When the transportation apparatus 1000 or the entering vehicle 2000 stops or changes its direction and thus it is determined there is a low possibility that a collision may happen, the controller 120 may display information 30 indicating that the danger element has been removed. That is, details of the information displayed on the transparent display 110 may be changed.

Figure 15:
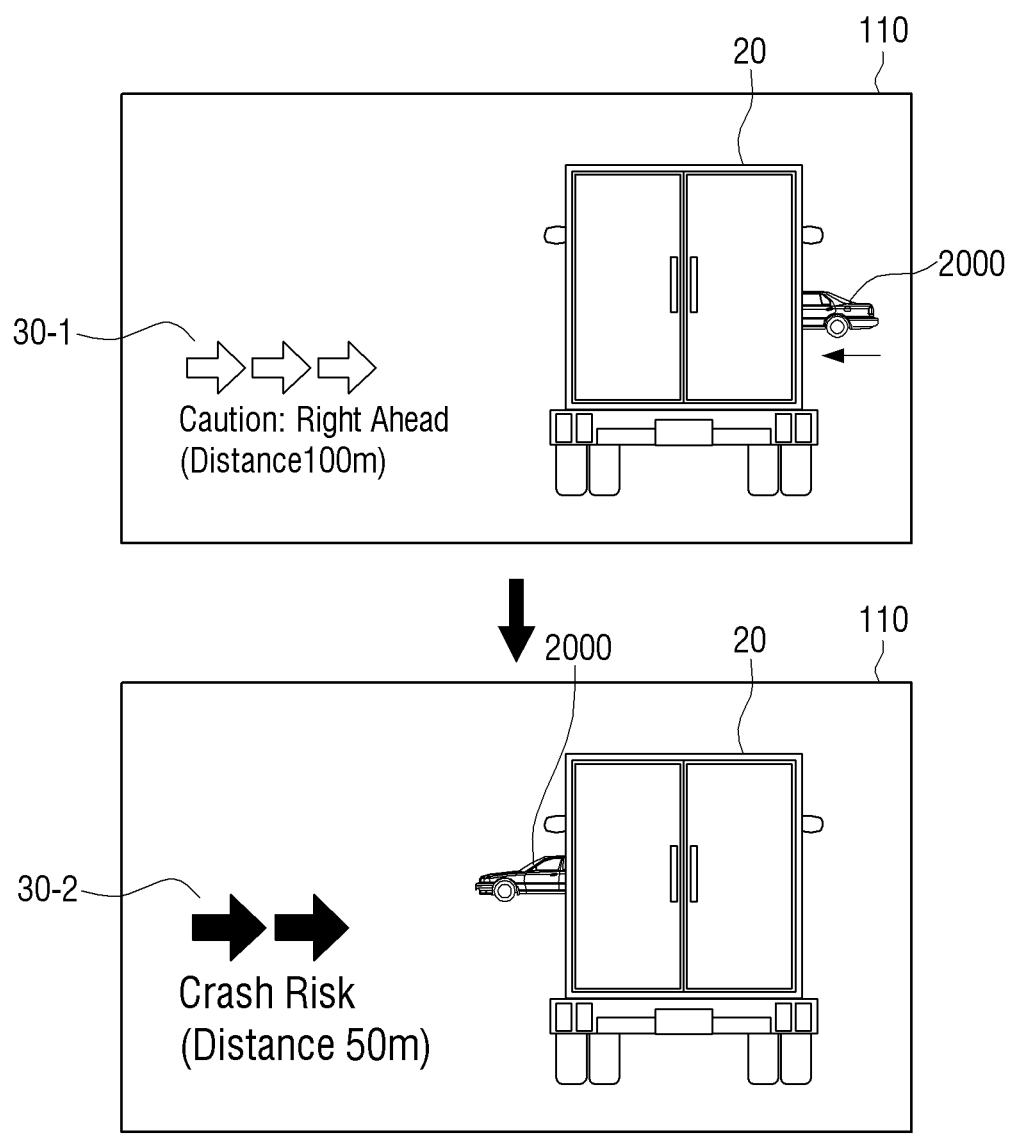

FIG. 15 is a view illustrating a method for display information according an exemplary embodiment. Referring to FIG. 15, the display location of the information may be determined according to a user's location in the same situation. That is, the information is displayed on an area in front of the user from among all areas of the transparent display 110. In this case, when the danger element 2000 is far from the transportation apparatus, information 30-1 for just calling user's attention may be displayed, and, when the danger element 2000 approaches and thus the risk of collision increases, the information may be changed to information 30-2 of an increased caution level. Referring to FIG. 15, the information 30-1 and 30-2 may include an arrow indicating the location of the danger element 2000, a caution phrase, and a distance to the danger element.

Also, although the information is displayed according to a possibility of a collision with external objects which are being moved in the above-described exemplary embodiment, a possibility of a collision with a stationary external object may be considered.

Figure 16:
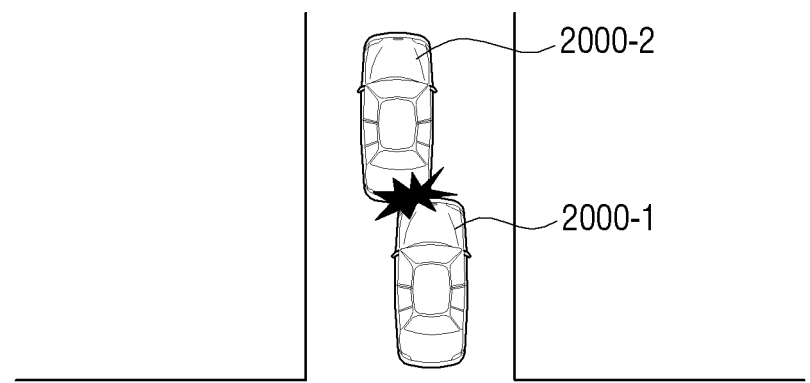
Figure 16:
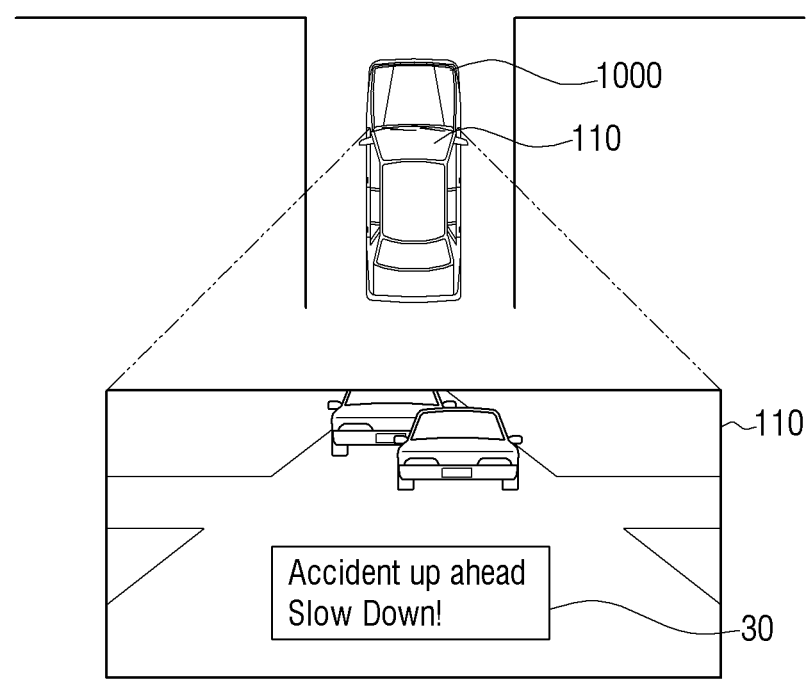

FIG. 16 is a view illustrating a method for displaying information. Referring to FIG. 16, when external objects 2000-1 and 2000-2 obstruct a road, and thus there is a risk of collision, information 30 is displayed. The information 30 may be generated according to a current situation. For example, when there is a risk of collision due to a vehicle accident as shown in FIG. 16, the information 30 for informing that there is a danger element due to a vehicle accident may be displayed.

Surrounding situation information for informing a situation such as a vehicle accident, collapse of surrounding facilities, or a road closure may be transmitted from an external server such as a traffic control server. In this case, even when visibility is reduced due to a dark night or fog, it is possible to display the information through the transparent display 110 in advance, and thus prevent an accident.

The display location of the information 30 may be adjusted according to a direction in which the user is looking. To achieve this, a direction of a user's field of view is grasped by tracing user's eyes or a facial direction and then information is displayed on an area corresponding to the direction. At this time, in order to measure the user's field of view more exactly, a plurality of internal image pickup units 151 may be used.

Figure 17:
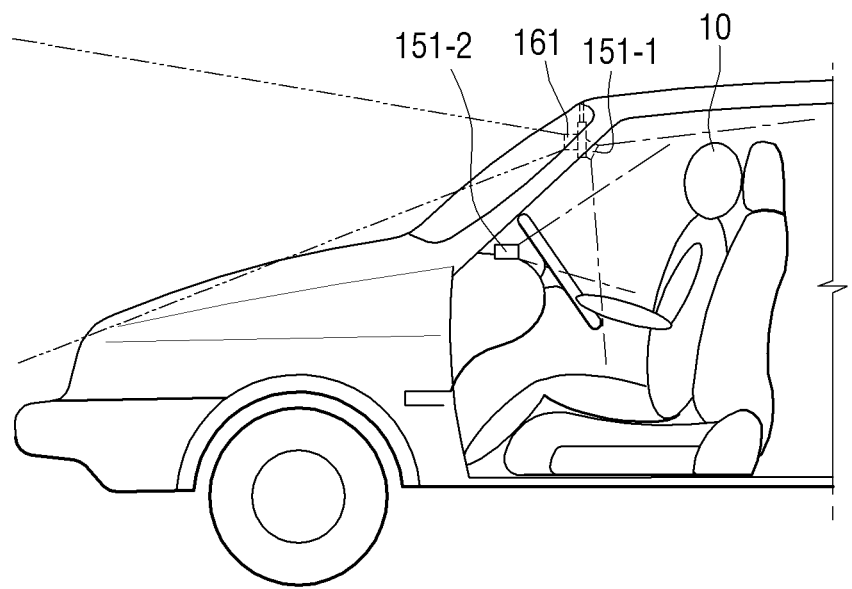
FIG. 17 is a view illustrating a method for detecting a user's location.

FIG. 17 is a view illustrating an example of arrangement of the internal image pickup unit 151 and the external image pickup unit. Referring to FIG. 17, the internal image pickup units 151 are disposed in different directions with reference to a user's location, and thus photograph the user from a plurality of different angles. In FIG. 17, two internal image pickup units 151-1 and 151-2 are illustrated. The first internal image pickup unit 151-1 may be mounted on a room mirror, whereas the second internal image pickup unit 151-2 may be mounted on a surface in front of the user. The arrangement of FIG. 17 is merely an example and the number and locations of the internal image pickup units 151 are not limited to those of FIG. 17. The external image pickup unit 161 may be disposed opposite the first internal image pickup unit 151-1. The controller 120 may analyze an image photographed by each of the first and second internal image pickup units 151-1 and 151-2 and traces a user's facial direction or user's eyes, and may detect a field of view according to a result of the tracing.

Specifically, the controller 120 detects an edge from an image photographed by the first internal image pickup unit 151-1, and detects an area corresponding to a user's face or pupil from among object areas divided by the edge. The area corresponding to the user's face or pupil may be detected based on a color of the object area. For example, a portion in which a plurality of pixel blocks having pixel values corresponding to a face color or a pupil color are grouped may be detected as a facial area or a pupil area.

The controller 120 may determine in which direction the user is looking, that is, may determine whether the user is looking ahead, is looking up, is looking down, is looking to the left, or is looking to the right, considering a distance to the user, a size of a facial area, and a shape of the facial area. For example, if the detected facial area is symmetrical vertically and horizontally and the size of the facial area is the greatest, it is determined that the user is looking ahead. On the other hand, if the facial area is less than a minimum and is not symmetrical vertically, it may be estimated whether the user is looking to the left or right by comparing a size of a left area and a size of a right area with reference to a center line of the facial area. In the case of user's eyes, it may be estimated in which direction the user is looking considering a ratio of an area corresponding to the white of the eye to an area of the user's eye and a ratio of an area corresponding to the pupil of the eye to the area of the user's eye.

In the same way, the controller 120 may analyze a frame photographed by the second internal image pickup unit 151-2. The controller 120 combines results of analyzing data photographed by the first and second internal image pickup units 151-1 and 151-2, and estimates a facial direction of the user or a direction of the user's eyes. Also, a field of view is estimated by applying a general person's angle of view with reference to the estimated direction. The controller 120 displays a variety of information 30 within the user's field of view.

Figure 18:
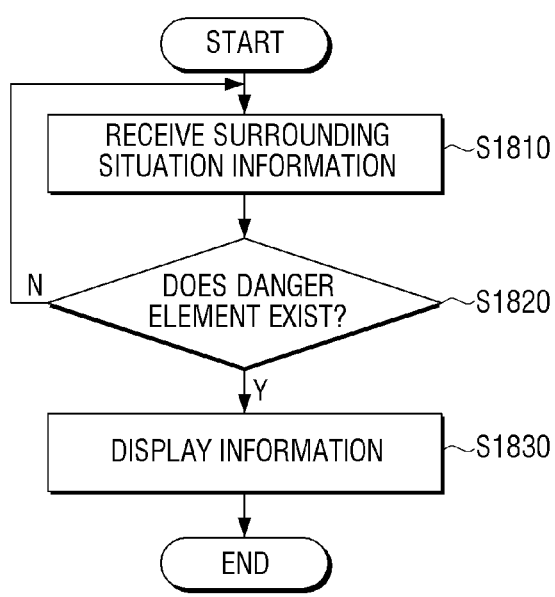
FIG. 18 is a flowchart illustrating a display method according to an exemplary embodiment.

FIG. 18 is a flowchart to explain a basic flow of a display method according to an exemplary embodiment.

Referring to FIG. 18, the transparent display apparatus 100 receives surrounding situation information (operation S1810). The surrounding situation information is information for informing a situation of a surrounding area of a transportation apparatus in which the transparent display apparatus 100 is mounted. The surrounding situation information may be provided from various sources such as an external server, a surrounding transportation apparatus, and an external camera.

The transparent display apparatus 100 analyzes the received surrounding situation information, recognizes surrounding objects, and determines whether there is a danger element from among the recognized surrounding objects (operation S1820). The method for determining the danger element has been described above and thus a redundant explanation is omitted.

When there is a danger element, the transparent display apparatus 100 displays information on the danger element on the transparent display 110 (operation S1830). The examples of the information on the danger element and the display method thereof have been described in the above-described exemplary embodiments, and thus a redundant explanation is omitted.

Although not shown in FIG. 18, the transparent display apparatus 100 may determine a characteristic of the danger element based on the surrounding situation information. Also, the display method may further include adjusting at least one of a color, a size, a display time, a display location, a blink state, a font, and a text thickness of the information displayed on the transparent display according to the characteristic of the danger element. For example, when there is a high possibility that a collision occurs and the danger element is a large danger element, the information may be displayed in more conspicuous color and for a longer time. Also, the information may blink or may be displayed using a bold type text or a specific font. On the other hand, when there is a low possibility that a collision occurs and the danger element is a relatively less dangerous and small danger element such as a ball or balloon moving into a road, a color, a display time, a blink state, a font, a text thickness of the information may be differently applied.

The characteristic of the danger effect may be a location, a kind, a moving speed, and a GPS value of the danger element as described above, The information may be a graphic object which represents at least one of a location and a kind of the danger element, a distance between the transportation apparatus and the danger element, an approach speed of the danger element, and an estimated collision time.

In particular, the information may include an image corresponding to the kind of the danger element. However, the information may represent the danger element using a simple graphic sign. Also, because it is not possible to exactly know the height of the danger element from the surface of the earth, the location of the danger element may be represented in a simple bar graph form. Also, the danger element may be divided into a vehicle, a bicycle, a pedestrian, and other objects (for example, a ball or animal), and may be represented in different size or color. Also, the size of the information may be reduced in comparison with a real size such that the user can see the movement of the danger element at a glance. Also, the color, brightness, or size of the information may be adjusted differently according to a degree of dangerousness. That is, when the degree of dangerousness increases, the information may be displayed in red or along with a large image, and, when the degree of dangerousness decreases, the image may be displayed in light yellow or along a small image. Also, when the danger element is hidden by an obstacle, the size or color of the information may be changed or a blinking effect is added such that the user can know that the danger element is hidden.

Also, in addition to the simple information 30, distance information to the danger element may be displayed by drawing a line from a point corresponding to the location of the user 10 on the transparent display 110 to a point corresponding to the location of the danger element.

Also, the surrounding situation information may be provided from various sources as described above. Hereinafter, a method for providing surrounding situation information to a transportation apparatus by a server will be described in detail.

The server may be connected to each vehicle through one-way communication or two-way communication.

According to an exemplary embodiment in which one-way communication is performed, the server may provide a variety of information to vehicles in a broadcasting method. The information to be provided may include a location, a moving speed, and a moving direction of each vehicle in a cell which is managed by the server.

Figure 19:
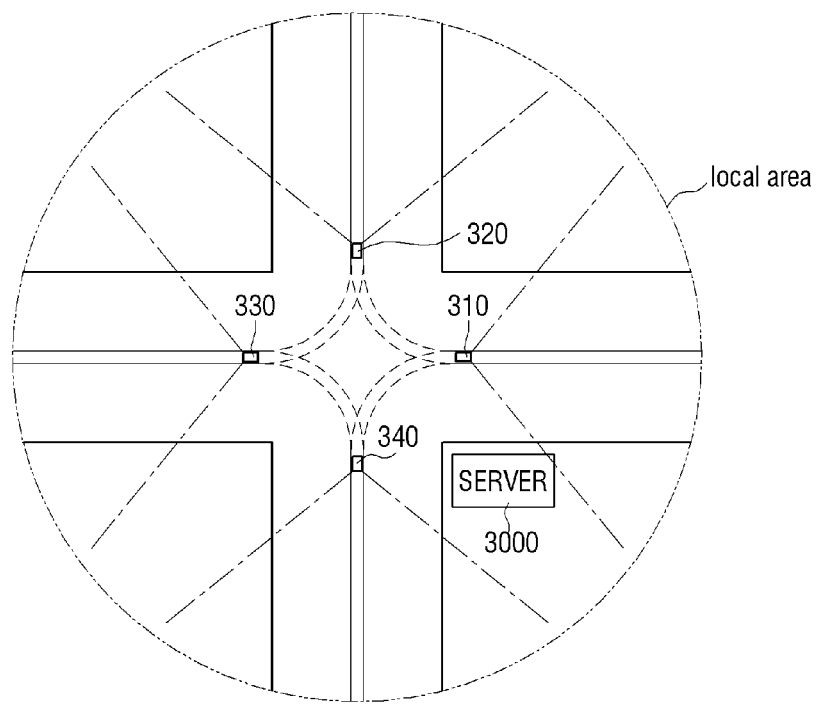
FIG. 19 is a view illustrating an example of a server for providing surrounding situation information to transportation apparatus.

FIG. 19 is a view illustrating an example of a server which provides surrounding situation information to transportation apparatuses according to a one-way communication method. In FIG. 19, the transportation apparatuses are vehicles. Referring to FIG. 19, sensor 310, 320, 330, and 340 may be provided on roads in each direction in a road environment such as an intersection. The sensors may be implemented by using cameras, or may be implemented by using various kinds of sensors for detecting a speed and a distance of a transportation apparatus on each road, such as an acceleration sensor and a proximity sensor.

Each sensor collects a road situation on a real time basis and then transmits the road situation to a server 3000. The server 300 is a server that manages a specific local area. The server 3000 generates surrounding situation information of the local area based on the information received from each of the sensors 310, 320, 330, and 340.

For example, the sensors 310, 320, 330, and 340 may include cameras. The camera may be placed at the intersection or on the road and may obtain vision information on a dangerous situation in each direction, that is, a photo. Accordingly, each sensor 310 to 340 may collect information on a vehicle which violates a traffic signal or speeds and rushes on a real time basis.

The server 3000 analyzes the photos provided from the sensors 310 to 340 and obtains location information on each vehicle. Specifically, the server 3000 may determine the location of the vehicle by comparing known locations of surrounding structures such as buildings, streetlamps, and street side trees, and the location of the vehicle. Alternatively, the server 3000 may count a number of white dotted lines indicating lanes in the photo, and may determine the location of the vehicle using a distance corresponding to the number of white dotted lines. Also, the server 3000 may analyze a size and a location of an object displayed on the photo and may determine the location of the vehicle. This exemplary embodiment will be explained in detail.

For an example, the sensors 310 to 340 may include a speed measuring device. The server 3000 may analyze information sensed by the sensors 310 to 340 and may calculate location information and a speed of the vehicle, and a distance to the vehicle.

The server 3000 broadcasts the generated surrounding situation information in the local area. The broadcasting may be performed within a specific radio frequency band.

Accordingly, each transportation apparatus which enters the local area may receive the broadcasted surrounding situation information from the server 3000, and may recognize surrounding objects. Also, the transportation apparatus may estimate a possibility of a collision considering a characteristic of the surrounding object and a movement characteristic of the transportation apparatus.

Figure 20:
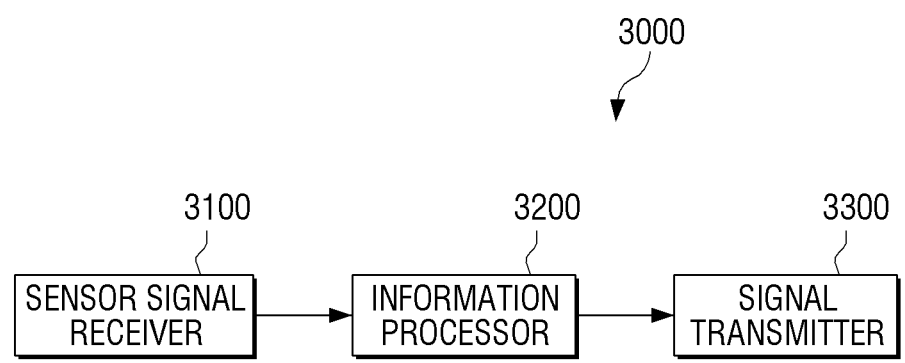
FIG. 20 is a block diagram illustrating a server configuration according to the exemplary embodiment of FIG. 19.

FIG. 20 is a block diagram illustrating a configuration of the server according to the exemplary embodiment of FIG. 19. Referring to FIG. 20, the server 3000 includes a sensor signal receiver 3100, an information processor 3200, and a signal transmitter 3300.

The sensor signal receiver 3100 receives sensor signals from the sensors 310, 320, 330, and 340 in the local area. The sensor signal receiver 3100 may be directly connected to the sensors 310, 320, 330, and 340 through a cable or may be connected to the sensors 310, 320, 330, and 340 through communication according to various wireless communication protocols.

The information processor 3200 analyzes identification information of the sensors 310, 320, 330, and 340 which has transmitted the sensor signals and the sensor signals, and generates surrounding situation information.

Specifically, if the sensors are cameras, the information processor 3200 receives a photo photographed by each camera, analyzes the received photo, and calculates movement information of an object based on a location, a size, and a shape of the photographed object. The movement information may be information on a moving direction and a moving speed of the object.

The information processor 3200 may calculate the movement information of the object in various ways. For example, the information processor 3200 may detect a moving direction and a moving speed of the object using lanes displayed on an image frame photographed by the sensors.

For example, lanes other than a center lane are displayed in dotted lines and thus are distinguished from the center lane. The information processor 3200 checks a number of dotted lines to a point where the object is located in the photo provided by the sensors 310 to 340. Because the dotted lines have the same length, the information processor 3200 calculates a distance to the object based on the number of dotted lines.

Many roads have an illuminator or a reflector arranged along the center lane periodically so that the center lane can be easily recognized at night. In this case, the information processor 3200 counts a number of illuminators or reflectors existing up to the point where the object is located and determines the distance to the object. Besides these, the location of the object may be calculated with reference to a gap between crosswalks or locations of surrounding geographical features.

The information processor 3200 may calculate a distance to the object in the next photo provided by the sensors 310 to 340 in the same way. Accordingly, the information processor 3200 may grasp a moving direction of the object by comparing the distances calculated in the two photos. Also, the information processor 3200 may determine a moving direction of the object based on a placement direction of the lanes seen in the photo. For example, because most of the vehicles run in parallel with the lanes, a moving direction of the vehicle may be estimated based on the placement direction of the lanes. For example, if the lane turns its direction from the north to the east by about 20°, it may be determined that the vehicle is moving north-eastwards by 20°.

When the information processor 3200 finishes analyzing the sensor signals of the sensors 310, 320, 330, and 340, the information processor 3200 combines results of the analyzing and generates surrounding situation information. The signal transmitter 3300 broadcasts the surrounding situation information generated by the information processor 3200. A format of the surrounding situation information and a transmitting method thereof may be differently defined according to a communication protocol pre-defined for the server 3000. For example, the signal transmitter 3300 modulates the surrounding situation information in various methods such as a frequency modulation method, an amplitude modulation method, and a quadrature amplitude modulation (QAM) method, and then converts the surrounding situation information into an RF signal of a specific frequency band and outputs the RF signal through an antenna.

Although the server is provided outside the road and collect information from the sensors 310, 320, 330, and 340 in FIGS. 19 and 20, the server may include a sensor function.

Figure 21:
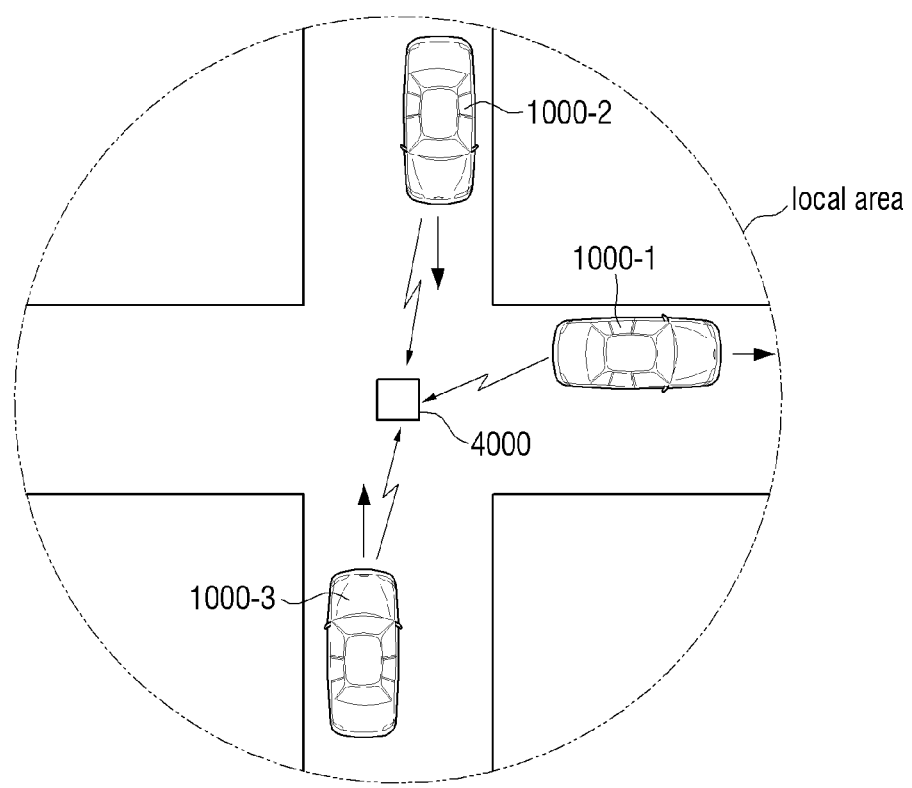
FIG. 21 is a view illustrating an example of a server for providing surrounding situation information to transportation apparatus.

FIG. 21 is a view illustrating an example of a configuration of a server which includes a sensor. Referring to FIG. 21, the server 4000 may be provided at a center of an intersection. The server 4000 may be buried under a bottom surface for the sake of road traffic, or may be provided on a gantry formed above the road such as a traffic light and a road sign. The server 4000 may directly generate traffic information using sensors disposed in each road direction.

In FIG. 21, the server 4000 may include a camera embedded therein. A plurality of cameras may be provided and may be placed in each road direction. The method for determining a location, a speed, and a direction of a vehicle using a photo photographed by a camera has been described above with reference to FIGS. 19 and 20, and thus a redundant explanation is omitted.

According to an exemplary embodiment, the server 4000 of FIG. 21 may include a distance sensor instead of the camera. That is, if a distance sensor is provided in each road direction, the distance sensors senses a distance to a transportation apparatus approaching the distance sensor. The server 4000 may calculate a speed of the transportation apparatus using a change in a distance between its location and the transportation apparatus, and a time. Accordingly, the server 4000 combines information on a server location, a distance between the server and the transportation apparatus, a direction of the transportation apparatus, and a speed of the transportation apparatus, generates surrounding situation information, and transmits the surrounding situation information to each transportation apparatus 1000-1, 1000-2, and 1000-3 in the local area. Each transportation apparatus may determine a possibility of a collision based on a distance between the server 400 and itself, a distance between another transportation apparatus and the server, their own speed, and a speed of another transportation apparatus.

According to an exemplary embodiment, the server of FIG. 21 may include a communication module instead of the camera or the distance sensor. That is, the server 400 may perform two-way communication with each transportation apparatus 1000-1, 1000-2, and 1000-3 in the local area. The server 4000 is not necessarily placed at the center of the intersection as shown in FIG. 21 when performing two-way communication. The server 4000 may be placed within any range that can communicate with the transportation apparatus of each direction.

In order to perform two-way communication, the server 4000 may broadcast a variety of connection information such as a service set identifier (SSID), an encryption key, an internet protocol (IP) address, and a reception frequency band in the local area. The transportation apparatuses 1000-1, 1000-2, and 1000-3 which enter the local area receive the broadcasted connection information and perform pairing with the server 4000 using the connection information.

If the pairing is completed, the server 4000 receives movement information of the transportation apparatus 1000-1, 1000-2, and 1000-3. The movement information may be speed information, GPS coordinates values, a type of a vehicle, and a moving direction.

The server 4000 combines the movement information collected in the local area, generates surrounding situation information, and transmits the generated surrounding situation information to each of the transportation apparatus 1000-1, 1000-2, and 1000-3 in the local area. A method for transmitting may be implemented in various methods such as unicast, multicast, or broadcast.

When performing two-way communication, the transportation apparatus 1000-1, 1000-2, and 1000-3 may inform the server 4000 of their respective states. For example, when the transportation apparatus 1000-1, 1000-2, and 1000-3 inform the server 4000 of their external states, such as internal pressure of a tire or a brake state, a current speed, and an advancing path determined by a navigation program, or inform the server 4000 of a user state such as drowsy driving, drunk driving, or user's negligence in keeping eyes forward in advance, the server 4000 may determine a danger element based on such information.

Figure 22:
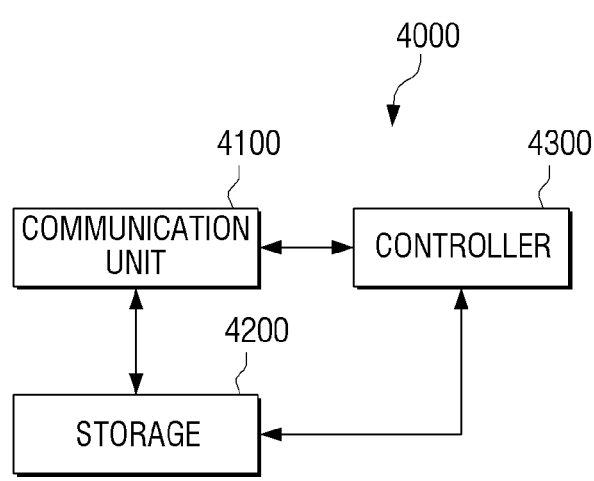
FIG. 22 is a block diagram illustrating a server configuration according to the exemplary embodiment of FIG. 21.

FIG. 22 is a block diagram illustrating a configuration of the server 4000 according to the exemplary embodiment of FIG. 21. Referring to FIG. 22, the server 4000 includes a communication unit 4100, a storage 4200, and a controller 4300.

The communication unit 4100 receives movement information of each transportation apparatus in the local area. The storage 4200 stores the received movement information. The controller 4300 combines the stored movement information and generates surrounding situation information at predetermined time intervals. The surrounding situation information may include a variety of information such as a real location, a moving speed, a moving direction, and a type of each transportation apparatus in the local area. The controller 4300 controls the communication unit 4100 to transmit the generated surrounding situation information to each transportation apparatus in the local area.

Accordingly, each transportation apparatus in the local area may obtain information on moving states of the other transportation apparatuses, may estimate a possibility of a collision with itself, and may display appropriate information.

According to an exemplary embodiment, the server may be implemented by a base station which communicates using a cellular network. In this case, a vehicle may communicate with the server by directly inserting a USIM card into a transparent display apparatus provided in the vehicle, or using a mobile phone connected to the vehicle.

The server may generate a variety of surrounding situation information such as a location, a moving speed, and a moving direction of each vehicle through the USIM card or mobile phone mounted in each vehicle, and may transmit the surrounding situation information to vehicles in a cell that the server manages. Transmitted data may include only the location and the speed, and an index of a corresponding region may be added. The index of the region refers to identification information which is uniquely assigned to each region. That is, one cell may be divided into a plurality of regions and an index may be assigned to each region. In this case, vehicles in each region detect only information to which an index of their region is assigned, and may determine a danger element in their region using the detected information. Such a region index may be assigned according various criteria such as an administrative district (for example, city, county, state, and country) or a road name, a crossroad, and a region of frequent accidents. The region index may be defined by a server operator and may be shared with a transportation apparatus. The transportation apparatus informs the server of a region index corresponding to a region where the transportation apparatus is located, and the server may selectively transmit information corresponding to the received region index or relevant data adjacent to the region index.

When the vehicle receives surrounding situation information from a server that has nothing to do with the current location of the vehicle, or receives surrounding situation information on a region that has nothing to do with the location of the vehicle, the vehicle may discard the received information or may store the received information so that the information can be used when the vehicle runs the relevant region in the future.

In the above, various exemplary embodiments in which a surrounding situation is grasped through the server have been described. However, according to still an exemplary embodiment, the transportation apparatus may grasp a surrounding situation by exchanging information with one another without the server.

Figure 23:
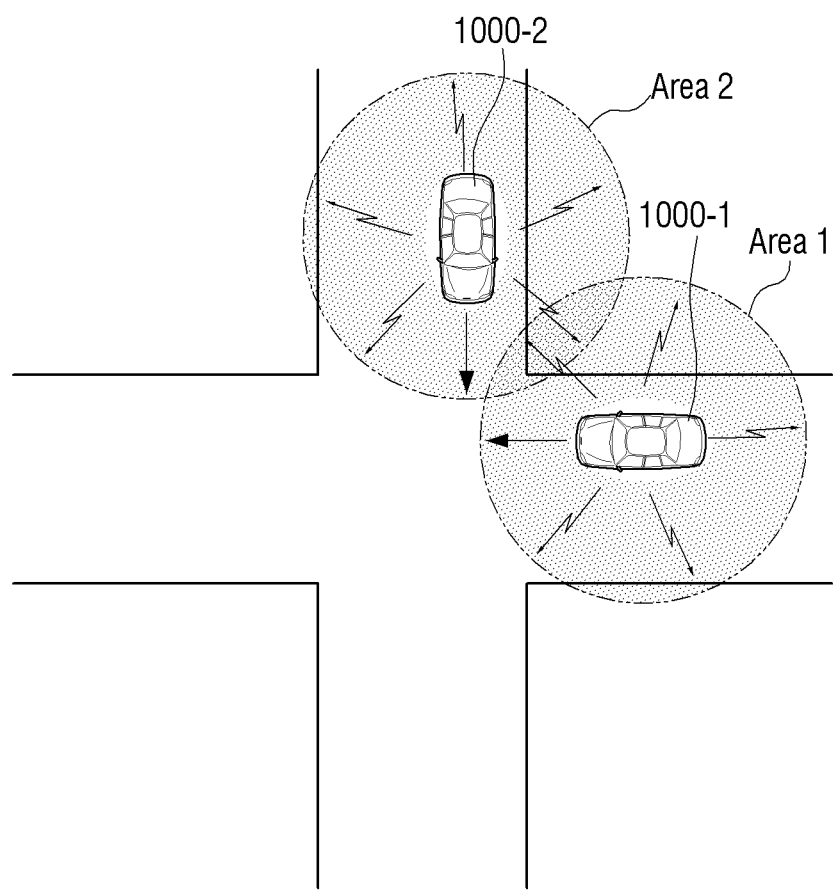
FIG. 23 is a view illustrating a method for obtaining surrounding situation information by transportation apparatus communicating with each other without a server.

FIG. 23 is a view to explain a method for obtaining surrounding situation information by transportation apparatus communicating with one another without a server. Referring to FIG. 23, when a communication range (area 1) of a first transportation apparatus 1000-1 and a communication range (area 2) of a second transportation apparatus 1000-2 overlap each other, the two transportation apparatuses 1000-1 and 1000-2 may identify each other's movement information. Accordingly, each transportation apparatus 1000-1 and 1000-2 determines a possibility of a collision and displays information on a transparent display provided therein according to a result of the determining.

In FIG. 23, each transportation apparatus 1000-1 and 1000-2 broadcasts their own movement information periodically, and receives movement information broadcasted by the other transportation apparatus in an RF communication method. That is, the transportation apparatus may include an antenna to exchange RF signals with each other, and may exchange movement information using the antenna.

According to a situation, the communication method may be performed according to various wireless communication protocols such as Bluetooth, Zigbee, and IEEE.

On the other hand, the surrounding situation information may be obtained by a camera attached to an exterior of a corresponding transportation apparatus rather than an external server or an external transportation apparatus.

Figure 24:
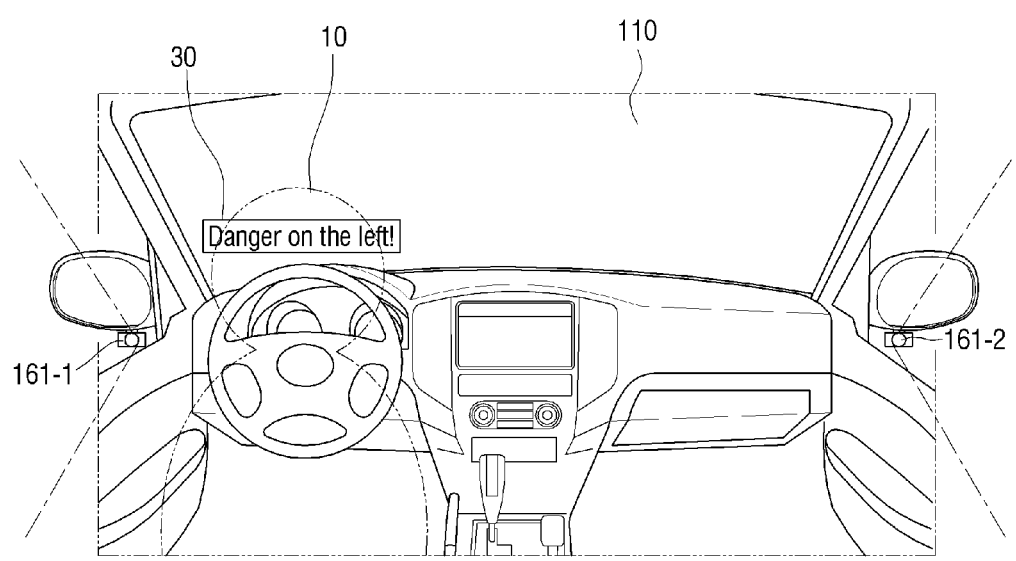
FIG. 24 is a view illustrating a method for displaying information in a transportation apparatus which includes an external image pickup unit disposed on left and right sides.

FIG. 24 is a view of an exemplary embodiment in which surrounding situation information is obtained using an external camera. Referring to FIG. 24, a plurality of external image pickup units 161-1 and 161-2 may be attached to an exterior of a transportation apparatus. A number of the external image pickup units 161-1 and 161-2, placement locations, and shapes may be implemented variously.

In FIG. 24, the first external image pickup unit 161-1 is disposed on a lower portion of a left side view mirror, and the second external image pickup unit 161-2 is disposed on a lower portion of a right side view mirror. The controller 120 may output information corresponding to an image photographed by the first external image pickup unit 161-1 or the second external image pickup unit 161-2 according to a user's intention. For example, when the user turns on a left direction indicator or turns a handle to the left by more than a predetermined level, the controller 120 may activate the first external image pickup unit 161-1 on the left and may receive an image photographed by the first external image pickup unit 161-1. The controller 120 analyzes the received image and determines whether there is a danger element in a left direction, and, when it is determined that there is a danger element in the left direction, displays information 30 on the danger element on the transparent display 110. On the other hand, when the user turns on a right direction indicator or turns a handle to the right by more than a predetermined level, the controller 120 may activate the second external image pickup unit 161-2 on the right and may receive an image photographed by the second external image pickup unit 161-2. Accordingly, the controller 120 determines whether there is a danger element in a right direction and displays information 30 according to a result of the determining.

A display location of the information 30 may be fixed to a front surface ahead of the user, or may be changed according to a turning direction. For example, when the user turns left, the information 30 may be displayed on a left area of the transparent display 110, and, when the user turns right, the information 30 may be displayed on a right area of the transparent display 110.

Although the information 30 is a warning message in FIG. 24, the image photographed by the first or second external image pickup unit 161-1 and 161-2 may be graphic-processed and may be displayed on the transparent display 110 as it is. Accordingly, a screen on a blind spot that cannot be seen through the side view mirror may be provided through the transparent display 110 as it is.

Although information on an external object that is likely to collide is displayed on the transparent display 110 in the above-described exemplary embodiment, this should not be considered as limiting. For example, if the external image pickup unit 161 is disposed on a front grill of a vehicle and overlooks a vehicle bumper, the user may park his/her vehicle while viewing an image photographed by the external image pickup unit 161.

Figure 25:
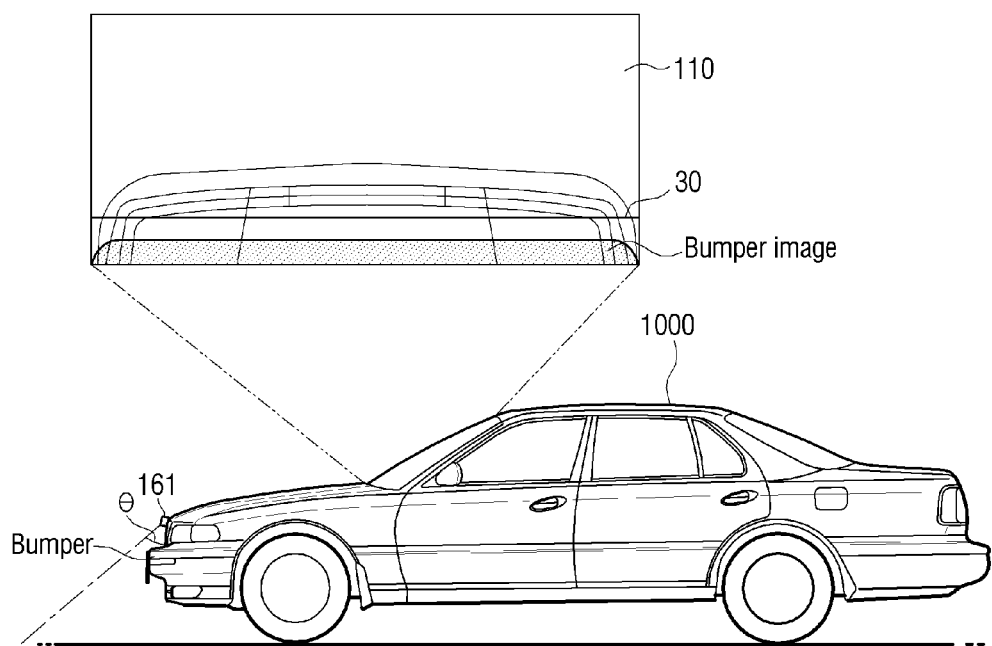
FIG. 25 is a view illustrating a method for displaying information in a transportation apparatus which includes an external image pickup unit on a front surface.

FIG. 25 is a view illustrating a method for identifying a blind spot using a transparent display. Referring to FIG. 25, an external image pickup unit 161 is disposed on a front grill of a transportation apparatus 1000. The external image pickup unit 161 photographs within a photographing range of a predetermined angle ($\theta$). The photographing range may be set according to a direction of a view from an upper end of the buffer. Although only one external image pickup unit 161 is illustrated in FIG. 25, a plurality of external image pickup units 161 may be arranged in parallel with one another at intervals and may photograph the bumper.

When the user 10 selects a parking mode, the controller 120 graphic-processes an image photographed by the external image pickup unit 161 and displays the image on a lower end of the transparent display 110. In this case, the user may check whether an end of the bumper touches an external object or not on a real time basis, while viewing a graphic image 30 of a real scene.

Also, the controller 120 may receive surrounding situation information from various sources in various ways, and may display a variety of information on the transparent display 110 according to the surrounding situation information. Accordingly, utilization of the transparent display apparatus increases and also a risk of collision of a transportation apparatus can be reduced.

Figure 26:
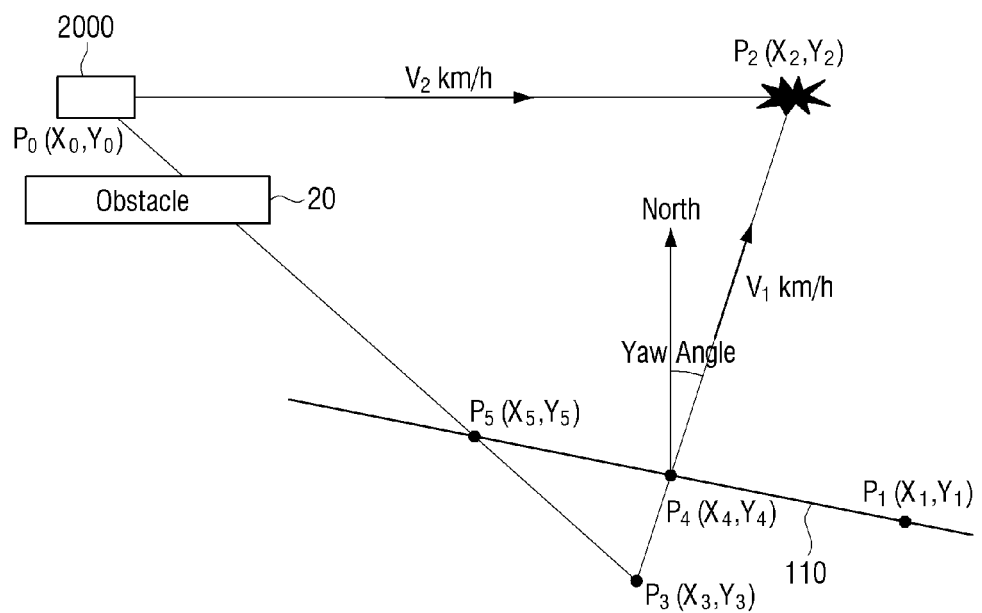
FIG. 26 is a view illustrating a transparent display apparatus which determines a danger element according to an exemplary embodiment.

FIG. 26 is a view illustrating a transparent display apparatus which displays information according to an exemplary embodiment.

Referring to FIG. 26, the transparent display apparatus may obtain an estimated collision point using a heading direction and a speed of a vehicle, and a heading direction and a speed of a danger element, and may additionally display information on the estimated collision point.

In FIG. 26, it is assumed that a location of a danger element is $P_0$ ($X_0$, $Y_0$), a center point of a transparent display 110 provided in a vehicle is $P_1$ ($X_1$, $Y_1$), an estimated collision point is $P_2$ ($X_2$, $Y_2$), a location of user's eyes is $P_3$ ($X_3$, $Y_3$), a user's location from which the estimated collision point is seen is $P_4$ ($X_4$, $Y_4$), and a location in which information on the danger element should be displayed from the user's location is $P_5$ ($X_5$, $Y_5$). In this case, because the center point $P_1$ of the transparent display 110 is determined based on a current location of the vehicle 1000, $P_1$ may be regarded as a current location of the vehicle 1000.

The estimated collision point $P_2$ may be determined based on the current location $P_1$, a heading direction and a speed $V_1$ of the vehicle 1000, and the current location $P_0$ and a speed $V_2$ of the danger element 2000. The heading direction of the vehicle 1000 may be determined by a yaw angle calculated in the vehicle 1000. The yaw angle may be calculated in various methods.

For example, the yaw angle may be calculated by a geomagnetic sensor provided in the vehicle 1000.

For an example, a server may calculate a yaw angle by identifying a heading direction of a vehicle on a road. That is, when the server determines that a vehicle moves along a specific road, the server may determine a heading direction of the vehicle based on a placement direction of the road. In this case, even if a separate sensor is not provided in the vehicle 1000, the heading direction may be obtained based on only a map and location information of the vehicle.

The estimated collision point $P_2$ may be calculated by the vehicle 1000, or alternatively, may be calculated by the server described above in the various exemplary embodiments.

The location of the user's eyes $P_3$ ($X_3$, $Y_3$) may be calculated by photographing a facial area of the user and calculating a distance between the facial area and the transparent display 110, and a location.

When the location of the user's eyes $P_3$ and the estimated collision point $P_2$ are calculated, the transparent display apparatus 100 obtains an intersection $P_4$ where a line connecting $P_3$ and $P_2$ and the transparent display 110 meet. The line connecting $P_3$ and $P_2$ may be expressed by following equation:

$$Y = \frac{Y3-Y2}{X3-X2}(X-X3) + Y3 \qquad \text{[Equation 1]}$$

A surface of the transparent display 110 may be expressed by following equation:

$$Y = \tan\theta(X-X1) + Y1 \qquad \text{[Equation 2]}$$

The transparent display apparatus 100 may combine equations 1 and 2 and may calculate their intersection $P_4$ ($X_4$, $Y_4$).

The transparent display apparatus 100 may display a graphic object such as a text or an image indicating the estimated collision point at the point $P_4$.

Also, the transparent display apparatus 100 calculates an intersection $P_5$ where a line connecting $P_3$ and the location of the danger element $P_0$, and the transparent display 110 meet.

The line connecting $P_3$ and $P_0$ may be expressed by following equation:

$$Y = \frac{Y3-Y0}{X3-X0}(X-X0) + Y0 \qquad \text{[Equation 3]}$$

The transparent display apparatus 100 may combine equations 3 and 2 and may calculate their intersection $P_5$.

The transparent display apparatus 100 may display information for presenting the danger element at the point $P_5$. The transparent display apparatus 100 calculates $P_5$ on a real time basis and displays information at that point such that the user can perceive the presence of the danger element 2000 hidden by an obstacle 20 and a location thereof at a glance.

As described in the exemplary embodiment of FIG. 26, the transparent display apparatus 100 may determine the danger element using equations 1, 2, and 3, and may determine on which area of the transparent display 110 the information on the estimated collision point or the danger element will be displayed. The method for determining and equations described in FIG. 26 may be applied to the process of determining a danger element or determining an information display area described in the above-described exemplary embodiments in the same way.

Although the information on the danger element is provided through the transparent display in the above-described exemplary embodiments, a photographed image which is provided from an external source may be provided through the transparent display, without determining the danger element directly.

Figure 27:
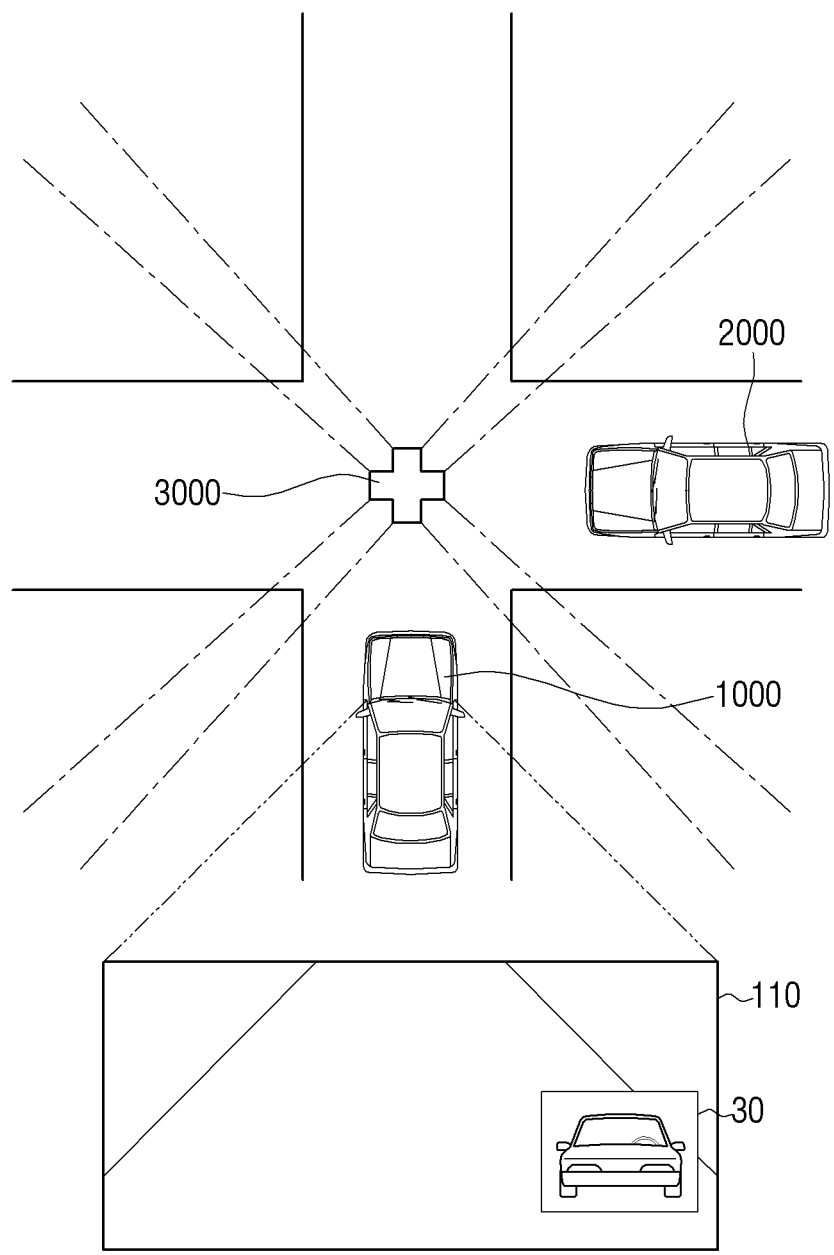
FIG. 27 is a view illustrating an operation of a transparent display apparatus which displays a photographed image according to an exemplary embodiment.

FIG. 27 is a view to explain an operation of a transparent display apparatus which provides a photographed image. Referring to FIG. 27, a server 3000 which includes a camera may be placed at a center of an intersection. The server 3000 photographs a vehicle in each direction and broadcasts a photographed image of the vehicle.

When a transportation apparatus 1000 entering the intersection receives a photographed image of another transportation apparatus 2000 which enters in a different direction, the photographed image 30 is displayed on the transparent display 110 as it is. According to this exemplary embodiment, the calculation burden of determining whether another transportation apparatus is a danger element or not is reduced, and also, the user can intuitively know a surrounding road situation.

Also, although the operations performed by the transparent display apparatus including the transparent display have been described in the above-described exemplary embodiments, these operations may be performed by a user terminal apparatus such as a mobile phone, a personal digital assistant (PDA), a tablet PC, or a laptop PC, rather than the transparent display apparatus.

Figure 28:
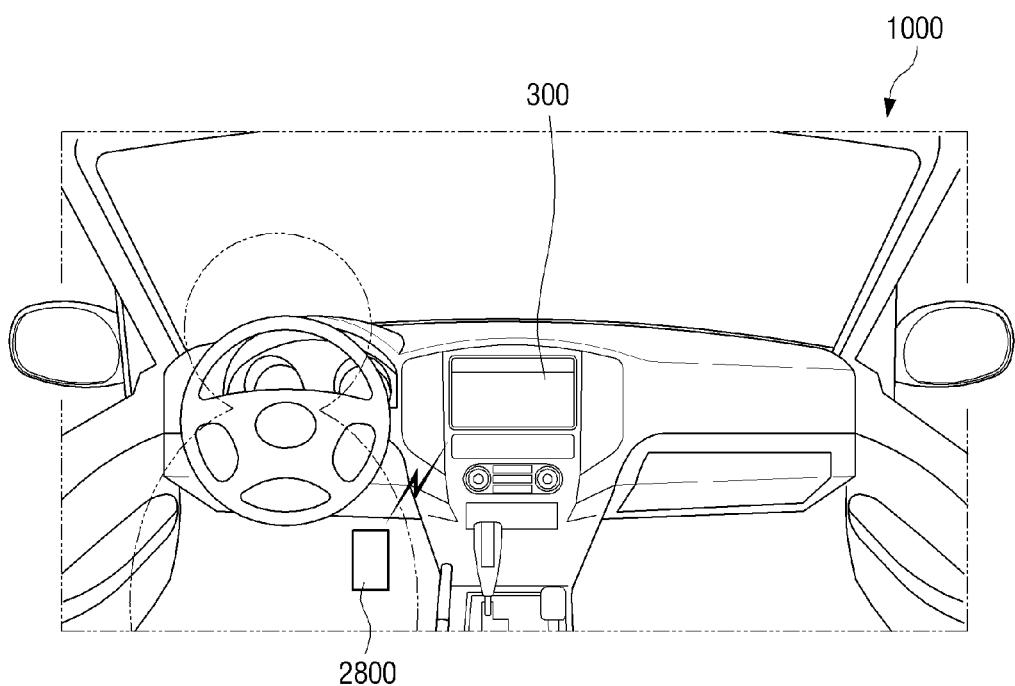
FIG. 28 is a view illustrating a user terminal apparatus and a transportation apparatus which are connected to each other according to an exemplary embodiment.

FIG. 28 illustrates a state of a user terminal apparatus 2800 connected to a transportation apparatus 1000. In FIG. 28, the transportation apparatus 1000 and the user terminal apparatus 2800 are connected to each other in a wireless communication method.

Referring to FIG. 28, the user terminal apparatus 2800 may be connected to a vehicle control system, a head unit, or a center fascia mounted in the transportation apparatus 1000, or a navigation device embedded in or connected to the transportation apparatus 1000. Hereinafter, the user terminal apparatus 2800 will be described as being connected to the transportation apparatus 1000 for convenience of explanation.

When the transportation apparatus 1000 and the user terminal apparatus 2800 are connected to each other as shown in FIG. 28, the user terminal apparatus 2800 receives surrounding situation information from an external server and controls the operation of the transportation apparatus using the surrounding situation information. The surrounding situation information may include a variety of information such as information on various objects existing within a local area managed by a server, a photographed image, and traffic information as described above.

The user terminal apparatus 2800 determines a location of the transportation apparatus 1000 using a GPS chip provided therein. That is, because the user terminal apparatus 2800 may be regarded as being located in the transportation apparatus 1000 when being connected to the transportation apparatus 1000, the location of the user terminal apparatus 2800 may be regarded as the location of the transportation apparatus.

The user terminal apparatus 2800 analyzes the surrounding situation information and recognizes surrounding objects, and determines a danger element that is likely to collide from among the surrounding objects, considering a location, a moving direction, and a moving speed of the transportation apparatus 1000. The user terminal apparatus 2800 provides information on the determined danger element to the transportation apparatus 1000. The transportation apparatus 1000 displays the information on the transparent display.

Figure 29:
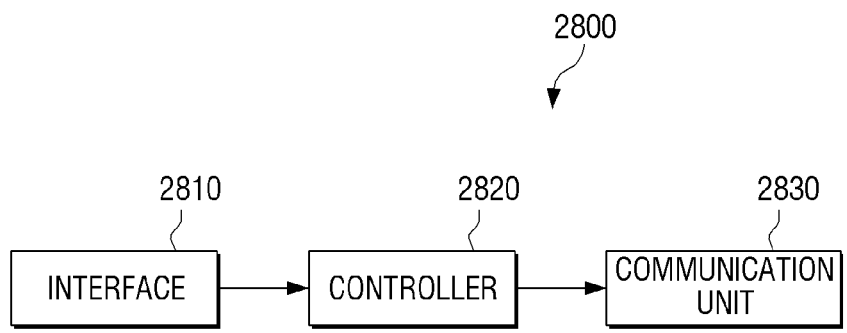
FIG. 29 is a block diagram illustrating a configuration of the user terminal apparatus of FIG. 28.

FIG. 29 is a block diagram illustrating a configuration of the user terminal apparatus according to an exemplary embodiment. Referring to FIG. 29, the user terminal apparatus 2800 includes an interface 2810, a controller 2820, and a communication unit 2830.

The interface 2810 is an element that is connected to the transportation apparatus 1000. The interface 2810 may be connected to the transportation apparatus 1000 in a wired or a wireless method. Specifically, the interface 2810 may be implemented by using various communication interfaces, such as Wi-Fi, Bluetooth, IEEE, Zigbee, near field communication (NFC), and USB interfaces.

The communication unit 2830 receives surrounding situation information from an external server. The communication unit 2830 may receive the surrounding situation information using an RF reception module to receive RF signals and a tuner to receive broadcast information, or may receive the surrounding situation information according to various communication methods such as Wi-Fi, Bluetooth, IEEE, and Zigbee.

The controller 2820 determines a danger element that is likely to collide with a transportation apparatus using the surrounding situation information received through the communication unit 2830 and a location of the transportation apparatus. The controller 2820 provides information for informing the determined danger element to the transportation apparatus 1000 through the interface 2810.

The controller 2820 may determine the location of the transportation apparatus using a GPS chip (not shown) provided in the user terminal apparatus 2800.

Also, the controller 2820 may analyze the surrounding situation information and recognize surrounding objects, and may determine a surrounding object that is determined to be likely to collide with reference to the location of the transportation apparatus from among the surrounding objects as a danger element. The method for determining has been described above and thus a redundant explanation is omitted.

The user terminal apparatus 2800 may include various elements according to a kind of the user terminal apparatus 2800. Specifically, the user terminal apparatus 2800 may have a configuration of FIG. 12.

When the danger element is determined, the controller 2820 provides information on the danger element to the transportation apparatus 1000. The transportation apparatus 1000 may display information on the transparent display based on the provided information. The information may be displayed in various forms as described above.

The transparent display apparatus according to various exemplary embodiments described above may be applied to not only a vehicle, but also various kinds of transportation apparatuses such as a ship, an airplane, a motorcycle, and a bicycle. In particular, if the transparent display apparatus is applied to a ship, a bottom surface of the ship may be implemented by a transparent display. In this case, the transparent display may be interlocked with a fish sensor and may display a variety of information on fish in a direction in which a fish exists. Also, a configuration of sea bottom may be explored by radar and the explored configuration of sea bottom may be displayed on the transparent display as a 3D graphic object.

The above-described various methods may be generated as software, and the software may be mounted in a transparent display apparatus or a display control system and performed.

Specifically, according to an exemplary embodiment, a non-transitory computer readable medium storing a program to perform: receiving surrounding situation information; recognizing surrounding objects using the surrounding situation information and determining a danger element that is likely to collide with a transportation apparatus using the surrounding situation information and location information of the transportation apparatus; and displaying information for informing a user of the danger element on a transparent display may be prepared, and may be provided to various kinds of apparatuses. Accordingly, information can be displayed on the transparent display according to the above-described exemplary embodiments.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blue-ray disk, a universal serial bus (USB), a memory card, and a read only memory (ROM), and may be provided.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A transparent display apparatus which is used in a vehicle, the transparent display apparatus comprising:
    a transparent display;
    a communication unit which receives surrounding situation information;
    a detector which detects at least one gaze direction of a user in the vehicle; and
    a controller which determines a danger element located in an area adjacent to the vehicle based on the at least one gaze direction of the user detected by the detector and the surrounding situation information, the danger element including a first object having at least a portion of the first object hidden by a second object as an obstacle in the detected at least one gaze direction of the user,
    wherein the controller:
        determines, from among regions of the transparent display, a first region through which the first object is located corresponding to the detected at least one gaze direction of the user, and a second region through which the second object is located corresponding to the detected at least one gaze direction of the user; and
        determines that the second object is the obstacle when the first and second regions corresponding to the detected at least one gaze direction of the user at least partially overlap to determine that the first object has at least the portion of the first object hidden by the second object.

2. The transparent display apparatus as claimed in claim 1, wherein the controller:
    recognizes surrounding objects in the area adjacent to the vehicle based on the surrounding situation information,
    determines a field of view of the user according to the detected at least one gaze direction of the user,
    determines, from among the surrounding objects, the first object to be at least partially hidden by the second object as the obstacle, when the first object is at least partially hidden by the second object within the field of view of the user, to thereby determine the first object as the danger element, and
    determines a display location of the notification information on the area of the transparent display associated with the actual location of the first object.

3. The transparent display apparatus as claimed in claim 2, wherein the controller displays the notification information regarding the danger element at least partially hidden by the obstacle and the different types of the notification information according to a dangerous level of the danger element, from among regions of the transparent display, on a region through which the obstacle is seen.

4. The transparent display apparatus as claimed in claim 2, wherein the controller displays the notification information from among regions of the transparent display, on a region corresponding to the detected at least one gaze direction of the user.

5. The transparent display apparatus as claimed in claim 1, wherein the controller adjusts at least one of a color, a size, a display time, a display location, a blink state, a font, and a text thickness of the notification information, which is displayed on the transparent display according to a characteristic of the danger element.

6. The transparent display apparatus as claimed in claim 1, wherein the notification information regarding the danger element is displayed as at least one graphic object which represents at least one of a location of the danger element, a kind of the danger element, a distance between the vehicle and the danger element, an approach speed of the danger element, and an estimated collision time.

7. The transparent display apparatus as claimed in claim 1, wherein the surrounding situation information is information on surrounding objects which are located in the area adjacent to the vehicle, comprising a current location of the vehicle.

8. The transparent display apparatus as claimed in claim 1, wherein, when the vehicle enters a location, the communication unit receives the surrounding situation information of the location from an external server which manages the location,
wherein the transparent display comprises a windshield of the vehicle.

9. The transparent display apparatus as claimed in claim 1, wherein the controller determines a movement characteristic of the vehicle, the movement characteristic of the vehicle comprising at least whether the vehicle is moved based on a change in a location of the vehicle, a moving direction, moving speed, a future moving location, and determines the danger element using the movement characteristic of the vehicle and the information.

10. The transparent display apparatus as claimed in claim 1, wherein the controller:
controls the transparent display to provide notification information associated with a location of the first object as the danger element at least partially hidden by the second object as the obstacle.

11. A method for displaying of a transparent display apparatus comprising a transparent display to be used in a vehicle, the method comprising:
receiving surrounding situation information;
detecting at least one gaze direction of a user in the vehicle;
determining a danger element located in an area adjacent to the vehicle, based on the detected at least one gaze direction of the user through the transparent display and on the surrounding situation information, the danger element including a first object that is at least partially hidden by a second object as an obstacle in the detected at least one gaze direction of the user; and
controlling the transparent display to provide notification information regarding the danger element and different types of notification information on an area of the transparent display associated with an actual location of the first object having at least a portion of the object hidden by the second object as the obstacle,
wherein the determining the danger element comprises:
determining, from among regions of the transparent display, a first region through which the first object is located corresponding to the detected at least one gaze direction of the user, and a second region through which the second object is located corresponding to the detected at least one gaze direction of the user; and
determining that the second object is the obstacle when determined that the first and second regions corresponding to the detected at least one gaze direction of the user at least partially overlap to determine that the first object has at least the portion of the first object hidden by the second object.

12. The method as claimed in claim 11, wherein the determining the danger element comprises:
recognizing surrounding objects in the area adjacent to the vehicle based on the surrounding situation information,
determining a field of view of the user according to the detected at least one gaze direction of the user through the transparent display,
determining, from among the surrounding objects, the first object to be at least partially hidden by the second object as the obstacle, when the first object is at least partially hidden by the second object within the field of view of the user, to thereby determine the first object as the danger element, and
determining a display location of the notification information on the area of the transparent display associated with the actual location of the first object.

13. The method as claimed in claim 12, further comprising displaying on the transparent display the notification information regarding the danger element and the different types of the notification information according to the dangerous level of the danger element,
wherein the displaying on the transparent display the notification information regarding the danger element and the different types of the notification information according to the dangerous level of the danger element comprises displaying the notification information regarding the danger element at least partially hidden by the obstacle and the different types of the notification information according to the dangerous level of the danger element, from among regions of the transparent display, on a region through which the obstacle is seen from among all regions of the transparent display.

14. The method as claimed in claim 12, further comprising displaying on the transparent display the notification information, wherein the displaying on the transparent display the notification information comprises displaying the notification information regarding the danger element from among regions of the transparent display, on a region corresponding to the detected at least one gaze direction of the user.

15. The method as claimed in claim 11, further comprising adjusting at least one of a color, a size, a display time, a display location, a blink state, a font, and a text thickness of the notification information, which is displayed on the transparent display according to a characteristic of the danger element.

16. The method as claimed in claim 11, wherein the notification information the notification information regarding the danger element is displayed as at least one graphic object which represents at least one of a location of the danger element, a kind of the danger element, a distance between the transportation apparatus and the danger element, an approach speed of the danger element, and an estimated collision time.

17. The method as claimed in claim 11, wherein the surrounding situation information is information on surrounding objects which are located in the area adjacent to the vehicle, comprising a current location of the vehicle.

18. The method as claimed in claim 11, wherein, when the vehicle enters a location, the surrounding situation information of the location is received from an external server which manages the location,
wherein the transparent display comprises a windshield of the vehicle.

19. The method as claimed in claim 11, wherein the determining the danger element comprises determining a movement characteristic of the vehicle, the movement characteristic of the vehicle comprising at least whether the vehicle is moved based on a change in a location of the vehicle, moving direction, moving speed, and a future moving location, and determining the danger element using the movement characteristic of the vehicle and the information.

20. The method as claimed in claim 11, further comprising controlling the transparent display to provide notification information regarding the danger element and different types of notification information associated with a location of the first object at least partially hidden by the second object as the obstacle.

21. A user terminal apparatus comprising:
an interface which is connectible with a vehicle;
a communication unit which receives surrounding situation information;
a detector which detects at least one gaze direction of a user in the vehicle; and
a controller which:
determines a danger element located in an area adjacent to the vehicle based on the at least one gaze direction of the user detected by the detector and on the surrounding situation information, the danger element including a first object having at least a portion of the object hidden by a second object as an obstacle in the detected at least one gaze direction of the user, and
provide notification information regarding the danger element,
wherein the controller:
determines, from among regions of the transparent display, a first region through which the first object is located corresponding to the detected at least one gaze direction of the user, and a second region through which the second object is located corresponding to the detected at least one gaze direction of the user; and
determines that the second object is the obstacle when the first and second regions corresponding to the detected at least one gaze direction of the user at least partially overlap to determine that the first object has at least the portion of the first object hidden by the second object.

22. The user terminal apparatus as claimed in claim 21, wherein, when the vehicle is connected to the user terminal apparatus through the interface, the controller:
determines a location of the vehicle using a GPS chip provided in the user terminal apparatus,
recognizes surrounding objects in the area adjacent to the vehicle based on the surrounding situation information, and
determines, from among the surrounding objects, the first object to be at least partially hidden by the second object as the obstacle, when the first object is at least partially hidden by the second object within the field of view of the user, to thereby determine the first object as the danger element, and
determines a display location of the notification information regarding the danger element.

23. A method for displaying of a user terminal apparatus, the method comprising:
receiving surrounding situation information;
detecting at least one gaze direction of a user in the vehicle;
determining a danger element located in an area adjacent to the vehicle based on the detected at least one gaze direction of the user and on the surrounding situation information, the danger element including a first object having at least a portion of the first object hidden by a second object as an obstacle in the detected at least one gaze direction of the user; and
providing notification information regarding the danger element,
wherein the determining the danger element comprises:
determining, from among regions of the transparent display, a first region through which the first object is located corresponding to the detected at least one gaze direction of the user, and a second region through which the second object is located corresponding to the detected at least one gaze direction of the user; and
determining that the second object is the obstacle when determined that the first and second regions corresponding to the detected at least one gaze direction of the user at least partially overlap to determine that the first object has at least the portion of the first object hidden by the second object.

24. A non-transitory computer-readable recording medium storing one or more programs to implement the method of claim 23.

25. A method for displaying a danger element on a transparent display apparatus used in a vehicle comprising a transparent display, the method comprising:
receiving surrounding situation information of the vehicle;
detecting at least one gaze direction of a user in the vehicle;
determining a danger element located in an area adjacent to the vehicle based on the detected at least one gaze direction of the user and on the surrounding situation information, the danger element including a first object having at least a portion of the first object hidden by a second object as an obstacle in the detected at least one gaze direction of the user; and
wherein the determining the danger element comprises:
determining, from among regions of the transparent display, a first region through which the first object is located corresponding to the detected at least one gaze direction of the user, and a second region through which the second object is located corresponding to the detected at least one gaze direction of the user; and
determining that the second object is the obstacle when determined that the first and second regions corresponding to the detected at least one gaze direction of the user at least partially overlap to determine that the first object has at least the portion of the first object hidden by the second object.

* * * * *